(12) United States Patent
Smith et al.

(10) Patent No.: US 10,698,284 B2
(45) Date of Patent: Jun. 30, 2020

(54) ZBD LIQUID CRYSTAL DEVICE AND METHODS OF OPERATING SUCH DEVICE

(71) Applicant: Sharp Kabushiki Kaisha, Osaka (JP)

(72) Inventors: Nathan James Smith, Oxford (GB); Andrew Acreman, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 18 days.

(21) Appl. No.: 16/139,413

(22) Filed: Sep. 24, 2018

(65) Prior Publication Data

US 2020/0096801 A1   Mar. 26, 2020

(51) Int. Cl.
*G02F 1/139* (2006.01)
*G09G 3/36* (2006.01)
*G02F 1/1337* (2006.01)

(52) U.S. Cl.
CPC ........ *G02F 1/1391* (2013.01); *G02F 1/13378* (2013.01); *G02F 1/133707* (2013.01); *G09G 3/3629* (2013.01)

(58) Field of Classification Search
None
See application file for complete search history.

(56) References Cited

U.S. PATENT DOCUMENTS

| | | | |
|---|---|---|---|
| 4,333,708 A | 6/1982 | Boyd et al. | |
| 5,796,459 A | 8/1998 | Bryan-Brown et al. | |
| 6,784,968 B1 | 8/2004 | Hughes et al. | |
| 6,903,790 B2 | 6/2005 | Kitson et al. | |
| 8,130,186 B2 | 3/2012 | Jones | |
| 9,280,018 B2 | 3/2016 | Mottram et al. | |
| 2005/0174340 A1* | 8/2005 | Jones | G02F 1/133753 345/204 |
| 2013/0342512 A1 | 12/2013 | Smith et al. | |

FOREIGN PATENT DOCUMENTS

GB        2346978 B      12/2001

\* cited by examiner

*Primary Examiner* — Christopher J Kohlman
(74) *Attorney, Agent, or Firm* — Renner, Otto, Boisselle & Sklar, LLP

(57) ABSTRACT

A liquid crystal device (LCD) includes from the viewing side: a first electrode layer; a viewing side first liquid crystal (LC) alignment layer; an LC layer; a non-viewing side second LC alignment layer; and a second electrode layer; wherein one of the electrode layers is a common electrode layer and the other of the electrode layers is a segmented electrode layer, and at least one of the first and second LC alignment layers is a bistable alignment layer that is switchable between a first alignment state and a second alignment state. The LCD is operated by applying a first voltage pulse to the segmented electrode layer and applying a second voltage pulse to the common electrode layer (Vcom pulse), the first and second voltage pulses combining to form a resultant voltage pulse. The bistable alignment layer switches from the first alignment state to the second alignment state when a magnitude of the resultant voltage pulse exceeds a switching voltage threshold.

17 Claims, 20 Drawing Sheets

Fig. 5

| Pulse voltage V | Effect on surface | Denotation |
|---|---|---|
| $0 \leq V < +Va$ | No change | $P_X^+$ |
| $+Va \leq V < +Vc$ | Changed to planar | $P_P^+$ |
| $+Vc \leq V$ | Changed to vertical (reverse latch) | $P_V^+$ |
| $0 \geq V > -Va$ | No change | $P_X^-$ |
| $-Va \geq V > -Vc$ | Changed to vertical | $P_V^-$ |
| $-Vc \geq V$ | Changed to planar (reverse latch) | $P_P^-$ |

Fig. 6

| Pulse voltage $V_p$ | Effect on surface | | Denotation |
|---|---|---|---|
| | Lower Voltage surface | Higher Voltage surface | |
| $0 \leq V < +Va$ | No change | No change | $P_{XX}^+$ |
| $+Va \leq V < +Vb$ | Changed to planar | No change | $P_{PX}^+$ |
| $+Vb \leq V < +Vc$ | Changed to planar | Changed to vertical | $P_{PV}^+$ |
| $+Vc \leq V < +Vd$ | Changed to vertical (reverse) | Changed to vertical | $P_{VV}^+$ |
| $+Vd \leq V$ | Changed to vertical (reverse) | Changed to planar (reverse) | $P_{VP}^+$ |
| $0 \geq V > -Va$ | No change | No change | $P_{XX}^-$ |
| $-Va \geq V > -Vb$ | Changed to vertical | No change | $P_{VX}^-$ |
| $-Vb \geq V > -Vc$ | Changed to vertical | Changed to planar | $P_{VP}^-$ |
| $-Vc \geq V > -Vd$ | Changed to planar (reverse) | Changed to planar | $P_{PP}^-$ |
| $-Vd \geq V$ | Changed to planar (reverse) | Changed to vertical (reverse) | $P_{PV}^-$ |

Fig. 8

| Pulse Set | Com Pulse | |
|---|---|---|
| | $-V_{com}$ pulse | $+V_{com}$ pulse |
| Accessible $V_{res}$ pulses | $P_X^-$ | $P_X^+$ |
| | $P_V^-$ | $P_P^+$ |
| | $P_P^-$ | $P_V^+$ |

| Pulse Set | Pulse 1 (+$V_{com}$ pulse) | Final State |
|---|---|---|
| 1 | $P_P^+$ | P |
| 2 | $P_V^+$ | V |

| Pulse Set | Pulse 1 (-$V_{com}$ pulse) | Final State |
|---|---|---|
| 1 | $P_P^-$ | P |
| 2 | $P_V^-$ | V |

Fig. 9

| Pulse Set | Com Pulse | |
|---|---|---|
| | $-V_{com}$ pulse | $+V_{com}$ pulse |
| Accessible $V_{res}$ pulses | $P_V^-$ | $P_P^+$ |
| | $P_P^-$ | $P_V^+$ |

| Pulse Set | Pulse 2 (+$V_{com}$ pulse) | | Final State |
|---|---|---|---|
| 1 | | $P_P^+$ | P |
| 2 | | $P_V^+$ | V |

| Pulse Set | Pulse 2 (−$V_{com}$ pulse) | | Final State |
|---|---|---|---|
| 1 | | $P_P^-$ | P |
| 2 | | $P_V^-$ | V |

Fig. 10

| Pulse Set | Com Pulse | |
|---|---|---|
| | −V$_{com}$ pulse | +V$_{com}$ pulse |
| Accessible V$_{res}$ pulses | P$_X^-$ | P$_X^+$ |
| | P$_V^-$ | P$_P^+$ |

| Pulse Set | Pulse 1 (−V$_{com}$ pulse) | Pulse 2 (+V$_{com}$ pulse) | Final State |
|---|---|---|---|
| 1 | N/A | P$_P^+$ | P |
| 2 | P$_V^-$ | P$_X^+$ | V |

| Pulse Set | Pulse 1 (+V$_{com}$ pulse) | Pulse 2 (−V$_{com}$ pulse) | Final State |
|---|---|---|---|
| 1 | P$_P^+$ | P$_X^-$ | P |
| 2 | N/A | P$_V^-$ | V |

Fig. 11

| Pulse Set | Com Pulse | |
|---|---|---|
| | $-V_{com}$ pulse | $+V_{com}$ pulse |
| Accessible $V_{res}$ pulses | $P_{XX}^-$ | $P_{XX}^+$ |
| | $P_{VX}^-$ | $P_{PX}^+$ |
| | $P_{VP}^-$ | $P_{PV}^+$ |
| | $P_{\underline{PP}}^-$ | $P_{\underline{VV}}^+$ |
| | $P_{\underline{PV}}^-$ | $P_{\underline{VP}}^+$ |

| Pulse Set | Pulse 1 ($+V_{com}$ pulse) | Pulse 2 ($+V_{com}$ pulse) | Final State |
|---|---|---|---|
| 1 | N/A | $P_{\underline{VP}}^+$ | VP |
| 2 | N/A | $P_{\underline{VV}}^+$ | VV |
| 3 | N/A | $P_{PV}^+$ | PV |
| 4 | $P_{VP}^-$ | $P_{PX}^+$ | PP |

| Pulse Set | Pulse 1 ($+V_{com}$ pulse) | Pulse 2 ($-V_{com}$ pulse) | Final State |
|---|---|---|---|
| 1 | N/A | $P_{\underline{PV}}^-$ | VP |
| 2 | $P_{PV}^+$ | $P_{VX}^-$ | VV |
| 3 | N/A | $P_{\underline{PV}}^-$ | PV |
| 4 | N/A | $P_{\underline{PP}}^-$ | PP |

Fig. 12

| Pulse Set | Com pulse | |
|---|---|---|
| | $-V_{com}$ pulse | $+V_{com}$ pulse |
| Accessible $V_{res}$ pulses | $P_{XX}^+$ | $P_{XX}^-$ |
| | $P_{XX}^-$ | $P_{XX}^+$ |
| | $P_{VX}^-$ | $P_{PX}^+$ |
| | $P_{VP}^-$ | $P_{PV}^+$ |
| | $P_{\underline{PP}}^-$ | $P_{\underline{VV}}^+$ |

| Pulse Set | Pulse 1 ($-V_{com}$ pulse) | Pulse 2 ($+V_{com}$ pulse) | Final State |
|---|---|---|---|
| 1 | $P_{VP}^-$ | $P_{XX}^+$ | VP |
| 2 | N/A | $P_{\underline{VV}}^+$ | VV |
| 3 | N/A | $P_{PV}^+$ | PV |
| 4 | $P_{\underline{PP}}^-$ | $P_{XX}^+$ | PP |

| Pulse Set | Pulse 1 ($+V_{com}$ pulse) | Pulse 2 ($-V_{com}$ pulse) | Final State |
|---|---|---|---|
| 1 | N/A | $P_{VP}^-$ | VP |
| 2 | $P_{\underline{VV}}^+$ | $P_{XX}^-$ | VV |
| 3 | $P_{PV}^+$ | $P_{XX}^-$ | PV |
| 4 | N/A | $P_{\underline{PP}}^-$ | PP |

Fig. 13

| Pulse Set | Com pulse | |
|---|---|---|
| | −V$_{com}$ pulse | +V$_{com}$ pulse |
| Accessible V$_{res}$ pulses | P$_{VX}^-$ | P$_{PX}^+$ |
| | P$_{VP}^-$ | P$_{PV}^+$ |
| | P$_{PP}^-$ | P$_{VV}^+$ |
| | P$_{PV}^-$ | P$_{VP}^+$ |

| Pulse Set | Pulse 1 (−V$_{com}$ pulse) | Pulse 2 (+V$_{com}$ pulse) | Final State |
|---|---|---|---|
| 1 | N/A | P$_{VP}^+$ | VP |
| 2 | N/A | P$_{VV}^+$ | VV |
| 3 | N/A | P$_{PV}^+$ | PV |
| 4 | P$_{VP}^-$ | P$_{PX}^+$ | PP |

| Pulse Set | Pulse 1 (+V$_{com}$ pulse) | Pulse 2 (−V$_{com}$ pulse) | Final State |
|---|---|---|---|
| 1 | N/A | P$_{VP}^-$ | VP |
| 2 | P$_{PV}^+$ | P$_{VX}^-$ | VV |
| 3 | N/A | P$_{PV}^-$ | PV |
| 4 | N/A | P$_{PP}^-$ | PP |

Fig. 14

| Pulse Set | Com pulse | |
|---|---|---|
| | $-V_{com}$ pulse | $+V_{com}$ pulse |
| Accessible $V_{res}$ pulses | $P_{XX}^-$ | $P_{XX}^+$ |
| | $P_{VX}^-$ | $P_{PX}^+$ |
| | $P_{VP}^-$ | $P_{PV}^+$ |
| | $P_{PP}^-$ | $P_{\underline{VV}}^+$ |

| Pulse Set | Pulse 1 ($-V_{com}$ pulse) | Pulse 2 ($+V_{com}$ pulse) | Final State |
|---|---|---|---|
| 1 | $P_{VP}^-$ | $P_{XX}^+$ | VP |
| 2 | N/A | $P_{\underline{VV}}^+$ | VV |
| 3 | N/A | $P_{PV}^+$ | PV |
| 4 | $P_{\underline{PP}}^-$ | $P_{XX}^+$ | PP |

| Pulse Set | Pulse 1 ($-V_{com}$ pulse) | Pulse 2 ($+V_{com}$ pulse) | Final State |
|---|---|---|---|
| 1 | N/A | $P_{VP}^-$ | VP |
| 2 | $P_{\underline{VV}}^+$ | $P_{XX}^-$ | VV |
| 3 | $P_{PV}^+$ | $P_{XX}^-$ | PV |
| 4 | N/A | $P_{\underline{PP}}^-$ | PP |

Fig. 15

| Pulse Set | Com pulse | |
|---|---|---|
| | $-V_{com}$ pulse | $+V_{com}$ pulse |
| Accessible $V_{res}$ pulses | $P_{PV}^+$ | $P_{VX}^-$ |
| | $P_{XX}^+$ | $P_{XX}^-$ |
| | $P_{XX}^-$ | $P_{XX}^+$ |
| | $P_{VX}^-$ | $P_{PX}^+$ |
| | $P_{VP}^-$ | $P_{PV}^+$ |

| Pulse Set | Pulse 1 ($+V_{com}$ pulse) | Pulse 2 ($-V_{com}$ pulse) | Pulse 3 ($+V_{com}$ pulse) | Final State |
|---|---|---|---|---|
| 1 | $P_{PV}^+$ | $P_{XX}^-$ | $P_{XX}^+$ | VP |
| 2 | $P_{PV}^+$ | $P_{XX}^-$ | $P_{VX}^-$ | VV |
| 3 | N/A | N/A | $P_{VX}^+$ | PV |
| 4 | N/A | $P_{VP}^-$ | $P_{PX}^+$ | PP |

| Pulse Set | Pulse 1 ($-V_{com}$ pulse) | Pulse 2 ($+V_{com}$ pulse) | Pulse 3 ($-V_{com}$ pulse) | Final State |
|---|---|---|---|---|
| 1 | N/A | N/A | $P_{VP}^-$ | VP |
| 2 | N/A | $P_{PV}^+$ | $P_{VX}^-$ | VV |
| 3 | $P_{XX}^-$ | $P_{XX}^+$ | $P_{XX}^-$ | PV |
| 4 | $P_{VP}^-$ | $P_{XX}^+$ | $P_{PX}^-$ | PP |

Fig. 16

| Pulse Set | Com pulse | |
|---|---|---|
| | $-V_{com}$ pulse | $+V_{com}$ pulse |
| Accessible $V_{res}$ pulses | $P_{XX}^-$ | $P_{XX}^+$ |
| | $P_{XX}^-$ | $P_{XX}^+$ |
| | $P_{VX}^-$ | $P_{PX}^+$ |
| | $P_{VP}^-$ | $P_{PV}^+$ |

| Pulse Set | Pulse 1 (+$V_{com}$ pulse) | Pulse 2 (-$V_{com}$ pulse) | Pulse 3 (+$V_{com}$ pulse) | Final State |
|---|---|---|---|---|
| 1 | n/a | $P_{VP}^-$ | $P_{XX}^+$ | VP |
| 2 | $P_{PV}^+$ | $P_{VX}^-$ | $P_{XX}^+$ | VV |
| 3 | N/A | N/A | $P_{PV}^+$ | PV |
| 4 | N/A | $P_{VP}^-$ | $P_{PX}^+$ | PP |

| Pulse Set | Pulse 1 (-$V_{com}$ pulse) | Pulse 2 (+$V_{com}$ pulse) | Pulse 3 (-$V_{com}$ pulse) | Final State |
|---|---|---|---|---|
| 1 | N/A | N/A | $P_{VP}^-$ | VP |
| 2 | N/A | $P_{PV}^+$ | $P_{VX}^-$ | VV |
| 3 | N/A | $P_{PV}^+$ | $P_{XX}^-$ | PV |
| 4 | $P_{VP}^-$ | $P_{PX}^+$ | $P_{XX}^-$ | PP |

Fig. 17

| Pulse Set | Com pulse | | | |
|---|---|---|---|---|
| | $-V1_{com}$ pulse | $+V1_{com}$ pulse | $-V2_{com}$ pulse | $+V2_{com}$ pulse |
| Accessible $V_{res}$ pulses | $P_{VX}^-$ | $P_{PX}^+$ | $P_{XX}^-$ | $P_{XX}^+$ |
| | $P_{VP}^-$ | $P_{PV}^+$ | $P_{VX}^-$ | $P_{PX}^+$ |

| Pulse Set | Pulse 1 ($+V1_{com}$ pulse) | Pulse 2 ($-V1_{com}$ pulse) | Pulse 3 ($+V2_{com}$ pulse) | Final State |
|---|---|---|---|---|
| 1 | N/A | $P_{VP}^-$ | $P_{XX}^+$ | VP |
| 2 | $P_{PV}^+$ | $P_{VX}^-$ | $P_{XX}^+$ | VV |
| 3 | $P_{PV}^+$ | $P_{VX}^-$ | $P_{PX}^+$ | PV |
| 4 | N/A | $P_{VP}^-$ | $P_{PX}^+$ | PP |

| Pulse Set | Pulse 1 ($-V1_{com}$ pulse) | Pulse 2 ($+V1_{com}$ pulse) | Pulse 3 ($-V2_{com}$ pulse) | Final State |
|---|---|---|---|---|
| 1 | $P_{VP}^-$ | $P_{PX}^+$ | $P_{VX}^-$ | VP |
| 2 | N/A | $P_{PV}^+$ | $P_{VX}^-$ | VV |
| 3 | N/A | $P_{PV}^+$ | $P_{XX}^-$ | PV |
| 4 | $P_{VP}^-$ | $P_{PX}^+$ | $P_{XX}^-$ | PP |

Fig. 18

| Pulse Set | Com pulse | | | |
|---|---|---|---|---|
| | -V1$_{com}$ pulse | +V1$_{com}$ pulse | -V2$_{com}$ pulse | +V2$_{com}$ pulse |
| Accessible V$_{res}$ pulses | P$^-_{VP}$ | P$^+_{PV}$ | P$^-_{VV}$ | P$^+_{VV}$ |
| | P$^-_{PP}$ | P$^+_{VV}$ | P$^-_{VV}$ | P$^+_{PV}$ |
| | P$^-_{PV}$ | P$^+_{VP}$ | | |

| Pulse set | Pulse 1 (+V1$_{com}$ pulse) | Pulse 2 (−V1$_{com}$ pulse) | Pulse 3 (+V2$_{com}$ pulse) | Final State |
|---|---|---|---|---|
| 1 | P$^+_{VP}$ | P$^-_{XX}$ | P$^+_{XX}$ | VP |
| 2 | P$^+_{VV}$ | P$^-_{XX}$ | P$^+_{XX}$ | VV |
| 3 | P$^+_{PV}$ | P$^-_{XX}$ | P$^+_{XX}$ | PV |
| 4 | P$^+_{VP}$ | P$^-_{XX}$ | P$^+_{PV}$ | PP |

| Pulse set | Pulse 1 (−V1$_{com}$ pulse) | Pulse 2 (+V1$_{com}$ pulse) | Pulse 3 (−V2$_{com}$ pulse) | Final State |
|---|---|---|---|---|
| 1 | P$^-_{VP}$ | P$^+_{XX}$ | P$^-_{XX}$ | VP |
| 2 | P$^-_{PV}$ | P$^+_{XX}$ | P$^-_{VX}$ | VV |
| 3 | P$^-_{VV}$ | P$^+_{XX}$ | P$^-_{XX}$ | PV |
| 4 | P$^-_{PP}$ | P$^+_{XX}$ | P$^-_{XX}$ | PP |

Fig. 19

| Pulse Set | Com pulse | | | |
|---|---|---|---|---|
| | $-V1_{com}$ pulse | $+V1_{com}$ pulse | $-V2_{com}$ pulse | $+V2_{com}$ pulse |
| Accessible $V_{res}$ pulses | $P_{PP}^-$ | $P_{VV}^+$ | $P_{XX}^-$ | $P_{XX}^+$ |
| | $P_{PV}^-$ | $P_{VP}^+$ | $P_{VX}^-$ | $P_{PX}^+$ |

| Pulse set | Pulse 1 ($+V1_{com}$ pulse) | Pulse 2 ($-V2_{com}$ pulse) | Pulse 3 ($+V2_{com}$ pulse) | Final state |
|---|---|---|---|---|
| 1 | $P_{VP}^+$ | $P_{XX}^-$ | $P_{XX}^+$ | VP |
| 2 | $P_{VV}^+$ | $P_{XX}^-$ | $P_{XX}^+$ | VV |
| 3 | $P_{VX}^+$ | $P_{XX}^-$ | $P_{PX}^+$ | PV |
| 4 | $P_{VP}^+$ | $P_{XX}^-$ | $P_{PX}^-$ | PP |

| Pulse set | Pulse 1 ($+V1_{com}$ pulse) | Pulse 2 ($-V2_{com}$ pulse) | Pulse 3 ($+V2_{com}$ pulse) | Final state |
|---|---|---|---|---|
| 1 | $P_{PP}^-$ | $P_{XX}^+$ | $P_{VX}^-$ | VP |
| 2 | $P_{PV}^-$ | $P_{XX}^+$ | $P_{VX}^-$ | VV |
| 3 | $P_{PV}^-$ | $P_{XX}^+$ | $P_{XX}^-$ | PV |
| 4 | $P_{PP}^-$ | $P_{XX}^+$ | $P_{XX}^-$ | PP |

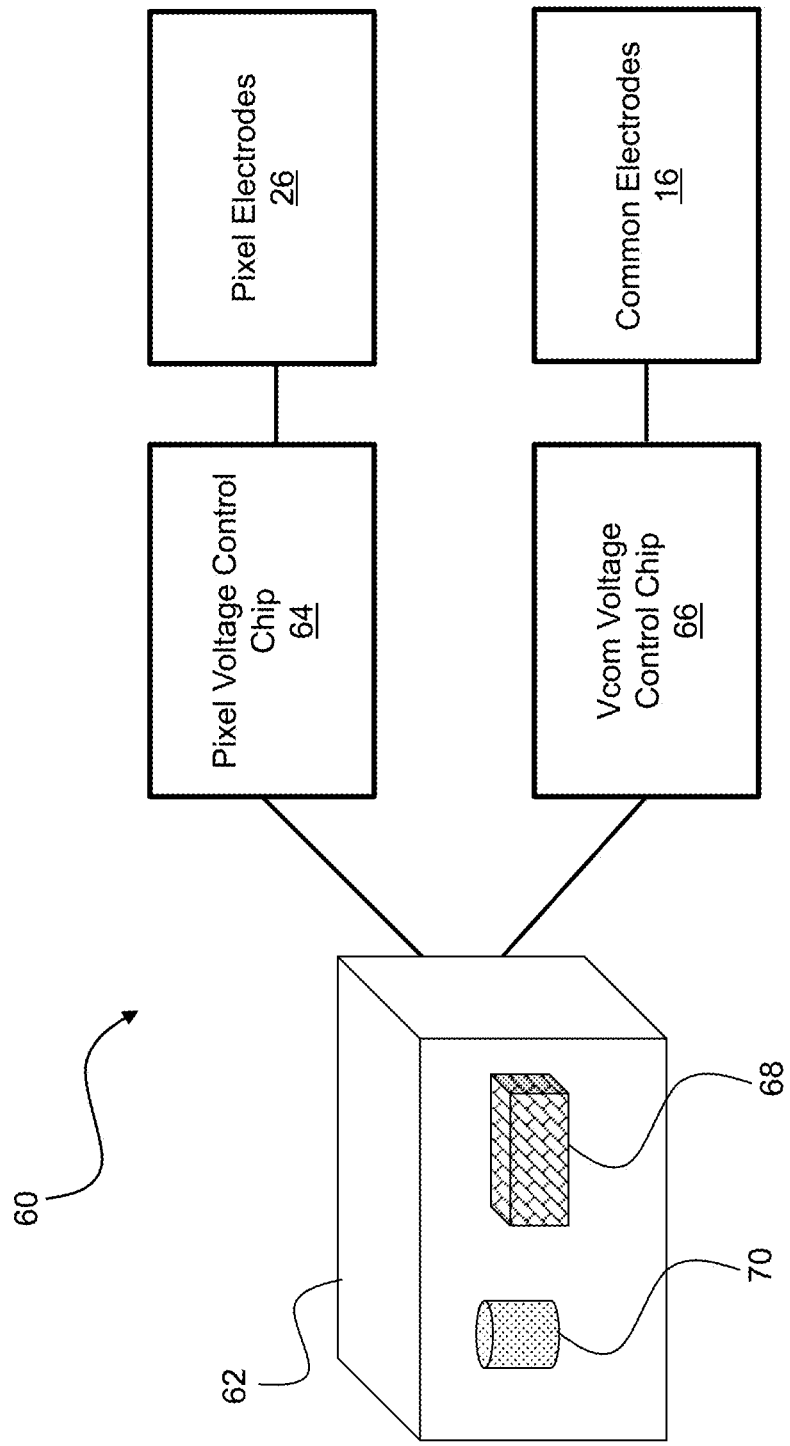

ZBD LIQUID CRYSTAL DEVICE AND METHODS OF OPERATING SUCH DEVICE

TECHNICAL FIELD

The present invention relates to liquid crystal display devices, and more specifically to liquid crystal display devices that are switchable between configurations or states having different optical characteristics, and methods of addressing such devices.

BACKGROUND ART

A conventional bistable liquid crystal display (LCD) has two stable liquid crystal (LC) configurations that can exist with no applied voltage. Switching between the two stable LC configurations is achieved via the application of a suitable voltage waveform, and the voltage waveform is not required to maintain either stable state but only to switch between the stable states. When combined with other optical components (e.g., polarizers), the two stable LC configurations have two optically distinct states. Because the voltage waveform is not required to maintain either stable state but only to switch between the stable states, no power is consumed in a stable LC configuration, and consequently bistable LCDs are attractive for their low power consumption. Bistable LCDs have been previously disclosed, for example, in U.S. Pat. No. 4,333,708 (Boyd et al., issued Jun. 8, 1982), U.S. Pat. No. 9,280,018 (Mottram et al., issue Mar. 8, 2016), U.S. Pat. No. 5,796,459 (Bryan-Brown et al., issued Aug. 18, 1998), and U.S. Pat. No. 6,903,790 (Kitson et al., issued Jun. 7, 2005).

Generally, a zenithal bistable display (ZBD) device includes a zenithal bistable alignment surface that is an LC alignment surface that can adopt either a substantially vertically aligned state or a substantially planar aligned state with respect to the LC molecules at the alignment surface. LCDs described in U.S. Pat. No. 6,784,968B1 have at least a first zenithally bistable alignment surface located on an opposite side of the LC layer from a monostable alignment surface (which has only a single alignment state). In other embodiments, U.S. Pat. No. 6,784,968B1 also discloses an LCD that has two zenithally bistable alignment surfaces facing or opposing each other with the LC layer disposed between the two zenithally bistable alignment surfaces. An LCD with two zenithally bistable alignment surfaces may have four stable LC configurations that each can exist with no applied voltage, by virtue of the different combinations of the horizontal and vertical alignment states of the two zenithally bistable alignment surfaces.

ZBD devices of the type described above are pixelated. As such, each pixel may be separately addressed with a driving voltage waveform to place a given pixel in a given LC configuration (and corresponding optical state), which as referenced above is a stable state that will persist when the voltage is removed. Subsequently, a suitable driving voltage waveform may be applied to switch the given pixel to another one of the stable LC configurations. By selectively addressing the various pixels, different optical states applied to the various pixels can be combined into images that are visible to a viewer of the display device. Example conventional systems and methods of addressing ZBD devices are described, for example, in GB 2346978 (Jones et al., issued Dec. 5, 2001), U.S. Pat. No. 6,784,968B1 (Hughes et al., issued Aug. 31, 2004), and U.S. Pat. No. 8,130,186B2 (Jones, issued Mar. 6, 2012).

Integrated circuit "control chips" are known in the art that act as addressing devices that can supply the driving voltages for addressing pixelated display devices. Such chips are difficult to design and expensive to manufacture. Accordingly, certain standardized or stock chips are available that typically are employed in the display industry for addressing pixelated displays. Such stock chips, however, have proven to be deficient for driving ZBD devices because the available driving voltages that can be outputted from stock or conventional control chips are limited. Accordingly, stock control chips as typically employed may not have the scope of potential output driving voltages to achieve each of the multiple LC configurations that otherwise could be achieved in a ZBD device, and thus the corresponding multiple optical states are not fully realized.

SUMMARY OF INVENTION

This present invention pertains to zenith bistable display (ZBD) based display systems and related methods of operating ZBD devices, and more specifically to driving and addressing schemes for a ZBD device including one or two bistable alignment layers, that can fully realize the different stable LC configurations using conventional addressing devices or control chips. The present invention realizes each of the bistable states of the LC configuration even under circumstances in which one electrode substrate of the ZBD device is driven by an addressing device or control chip that cannot operate at sufficiently high voltages to switch between all the bistable states of the ZBD alignment layer or layers with a single pulse. This is achieved by applying a voltage pulse to the common electrode layer, which is modulated at the pixel electrode in such a manner so that all pixels can be respectively switched to any one of the stable states simultaneously.

An aspect of the invention, therefore, is an enhanced operating method of operating a display device to achieve combinations of stable states of bistable LC alignment layers in a ZBD device, by modulating an additional voltage pulse applied to the common electrode layer with the voltage pulse applied at the segmented pixel electrode layer. In exemplary embodiments, the operating method includes steps of: providing a liquid crystal device (LCD) comprising from the viewing side: a first electrode layer; a viewing side first liquid crystal (LC) alignment layer; an LC layer; a non-viewing side second LC alignment layer; and a second electrode layer; wherein one of the electrode layers is a common electrode layer and the other of the electrode layers is a segmented electrode layer, and at least one of the first and second LC alignment layers is a bistable alignment layer that is switchable between a first alignment state and a second alignment state; and applying a first voltage pulse to the segmented electrode layer and applying a second voltage pulse to the common electrode layer (Vcom pulse), the first and second voltage pulses combining to form a resultant voltage pulse; wherein the bistable alignment layer switches from the first alignment state to the second alignment state when a magnitude of the resultant voltage pulse exceeds a switching voltage threshold.

Principles of the invention may be applied to ZBD devices having either one or two bistable alignment layers. Accordingly, in exemplary embodiments, the first LC alignment layer is a first bistable alignment layer and the second LC alignment layer is a second bistable alignment layer that are switchable between the first alignment state and the second alignment state. The first bistable alignment layer switches from the first alignment state to the second alignment state when a magnitude of the resultant voltage pulse exceeds a first switching voltage threshold, and the second bistable alignment layer switches from the first alignment state to the second alignment state when a magnitude of the resultant voltage pulse exceeds a second switching voltage threshold. In addition, the first bistable alignment layer switches from the second alignment state back to the first alignment state when the magnitude of the resultant voltage pulse exceeds a first reverse latch threshold that is greater than the first switching voltage threshold, and the second bistable alignment layer switches from the second alignment state back to the first alignment state when the magnitude of the resultant voltage pulse exceeds a second reverse latch threshold that is greater than the second switching voltage threshold. The second switching and second reverse latch threshold voltages respectively may be greater than the first switching and first reverse latch threshold voltages.

For ZBD devices including a single bistable alignment layer, the operating method may include setting a scope of accessible resultant voltage pulses such that a single resultant voltage pulse is required to achieve either stable state of the bistable alignment layer, or setting a scope of accessible resultant voltage pulses such that two resultant voltage pulses are required to achieve at least one stable state of the bistable alignment layer. For ZBD devices including first and second bistable alignment layers, the operating method may include setting a scope of accessible resultant voltage pulses such that two resultant voltage pulses are required to achieve any one of four stable state combinations of the first bistable alignment layer and the second bistable alignment layer, or setting a scope of accessible resultant voltage pulses such that three resultant voltage pulses are required to achieve at least one of the four stable state combinations of the first bistable alignment layer and the second bistable alignment layer.

Another aspect of the invention is a display system including a ZBD device having one or more bistable alignment layers in accordance with any of the embodiments. The display system includes a control system having a processing device that controls the application of voltage pulses to the ZBD device in accordance with features of any of the embodiments of the operating methods. The control system may operate by the processing device executing program code stored on a non-transitory computer readable medium.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 5 is a chart depicting pulse nomenclature of a single bistable alignment layer of a ZBD device.

FIG. 6 is a chart depicting pulse nomenclature of two bistable alignment layers of a ZBD device.

FIG. 8 is a chart grouping depicting a first switching logic for a first set of accessible resultant voltages to be applied to pixels of a ZBD device.

FIG. 9 is a chart grouping depicting a second switching logic for a second set of accessible resultant voltages to be applied to pixels of a ZBD device.

FIG. 10 is a chart grouping depicting a third switching logic for a third set of accessible resultant voltages to be applied to pixels of a ZBD device.

FIG. 11 is a chart grouping depicting a fourth switching logic for a fourth set of accessible resultant voltages to be applied to pixels of a ZBD device.

FIG. 12 is a chart grouping depicting a fifth switching logic for a fifth set of accessible resultant voltages to be applied to pixels of a ZBD device.

FIG. 13 is a chart grouping depicting a sixth switching logic for a sixth set of accessible resultant voltages to be applied to pixels of a ZBD device.

FIG. 14 is a chart grouping depicting a seventh switching logic for a seventh set of accessible resultant voltages to be applied to pixels of a ZBD device.

FIG. 15 is a chart grouping depicting an eighth switching logic for an eighth set of accessible resultant voltages to be applied to pixels of a ZBD device.

FIG. 16 is a chart grouping depicting a ninth switching logic for a ninth set of accessible resultant voltages to be applied to pixels of a ZBD device.

FIG. 17 is a chart grouping depicting a tenth switching logic for a tenth set of accessible resultant voltages to be applied to pixels of a ZBD device.

FIG. 18 is a chart grouping depicting an eleventh switching logic for an eleventh set of accessible resultant voltages to be applied to pixels of a ZBD device.

FIG. 19 is a chart grouping depicting a twelfth switching logic for a twelfth set of accessible resultant voltages to be applied to pixels of a ZBD device.

FIG. 20 is a drawing depicting a block diagram of an exemplary display control system in accordance with embodiments of the present invention.

DESCRIPTION OF EMBODIMENTS

Figure 1:
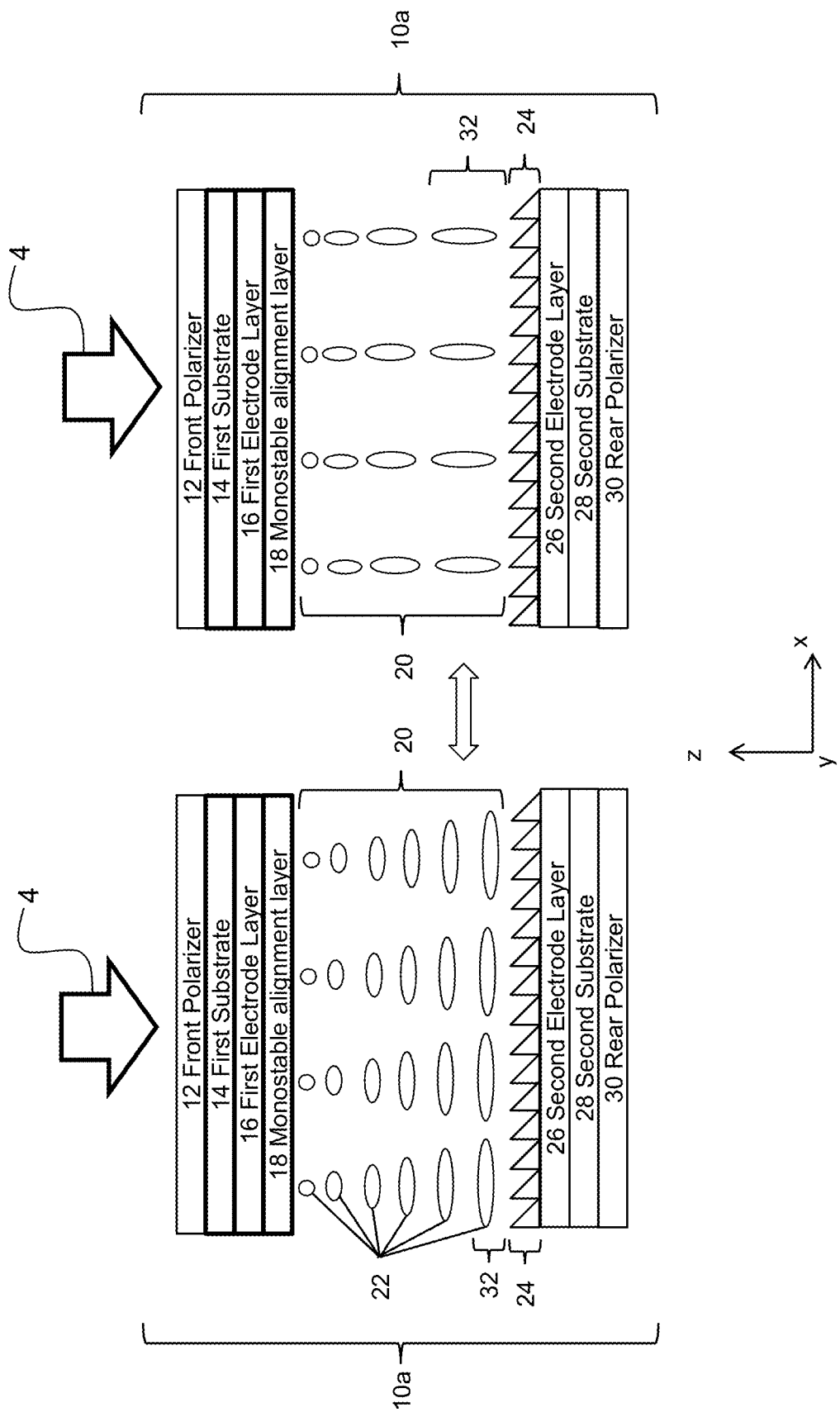
FIG. 1 is a schematic drawing depicting an LCD optical stack arrangement of an exemplary zenithal bistable display (ZBD) device.

Embodiments of the present invention will now be described with reference to the drawings, wherein like reference numerals are used to refer to like elements throughout. It will be understood that the figures are not necessarily to scale.

This present invention pertains to zenith bistable display (ZBD) based display systems and related methods of operating ZBD devices, and more specifically to driving and addressing schemes for a zenith bistable display (ZBD) device including one or two bistable alignment layers, that can fully realize the different stable LC configurations using conventional addressing devices or control chips. The present invention realizes each of the bistable states of the LC configuration even under circumstances in which one electrode substrate of the ZBD device is driven by an addressing device or control chip that cannot operate at sufficiently high voltages to switch between each of the bistable states of the ZBD alignment layer or layers with a single pulse. This is achieved by applying a voltage pulse to the common electrode layer, which is modulated at the pixel electrode in such a manner that all pixels can be respectively switched to any of the stable states simultaneously.

FIG. 1 is a schematic drawing depicting an LCD optical stack arrangement of an exemplary zenithal bistable display device 10a. The zenithal bistable display device 10a is shown with the viewing direction 4 identified to provide a directional viewpoint for the layers that form the optical stack of the zenithal bistable display device. From the viewing side, the zenithal bistable display (ZBD) device 10a includes a front polarizer 12, a first substrate 14, a first electrode layer 16, a monostable LC alignment layer 18, an LC layer 20 including individual LC molecules 22, a bistable alignment layer 24 with a grating structure having an associated grating vector, a second electrode layer 26, a second substrate 28, and a rear polarizer 30. The positions of the monostable LC alignment layer 18 and the bistable LC alignment layer 24 may be interchanged. The bistable alignment layer 24 is operable to align the LC molecules 22 in two different orientations in a region 32 adjacent to the surface of the bistable alignment layer 24, as further detailed below.

The monostable LC alignment layer 18 has a preset alignment effect that cannot be switched. In this particular example, the monostable LC alignment layer 18 is a planar LC alignment layer that aligns the LC molecules 22 in substantially the y-direction (into the plane of the page). As understood by those skilled in the art of LCs, the monostable LC alignment layer 18 may have a small pretilt angle of less than 15°. The bistable alignment layer 24 can align the LC molecules in a region 32 adjacent to the surface of the bistable alignment layer 24. As shown in the left portion of FIG. 1, the first bistable alignment direction in the region 32 is a planar LC orientation whereby the LC molecules are aligned substantially in the x-direction. As understood by those skilled in the art of LCs, the first bistable LC alignment direction may have a pretilt angle of less than 15. As shown in the right portion of FIG. 3, the second bistable alignment direction may be switched to a vertical LC orientation whereby the LC molecules are aligned substantially in the z-direction. As understood by those skilled in the art of LCs, the second bistable LC alignment direction may have a pretilt angle of between 75° and 90°.

Switching between the bistable planar LC alignment (FIG. 1, left portion) and the bistable vertical LC alignment (FIG. 1, right portion) is achieved via application of a known voltage waveform to the electrode layers 16 and 26. Once selected, either the bistable planar LC alignment state or the bistable vertical LC alignment state persists after the removal of the voltage, i.e., the surface region 32 has two different stable LC alignment directions. Therefore, a combination of the monostable alignment layer 18 and a single opposing bistable alignment layer 24 enables two distinct stable LC configurations. The first stable LC configuration as shown in the left portion of FIG. 1 is a 90° twisted LC structure. The second stable LC configuration as shown in the right portion of FIG. 1 is a hybrid aligned LC structure with LC deformation in the y-z plane only.

The transmission axis of the rear polarizer 30 is either parallel to, or perpendicular to, the bistable planar alignment direction. The transmission axis of the front polarizer 12 is orthogonal to the transmission axis of the rear polarizer 30. The rear polarizer 30 may comprise a polarizer and a combined reflective polarizer so that the zenithal bistable display device 10a may operate in a reflective mode, by which ambient light may be reflected to be viewed by the viewer. The bistable alignment layer 24 has a grating type structure with physical grooves.

While FIG. 1 illustrates an LCD optical stack in which the monostable LC alignment layer is such that the device is in either a hybrid aligned state or a twisted nematic state, principles of the invention are not limited based on the specific nature of the monostable alignment layer. For example, while FIG. 1 illustrates a configuration in which the monostable alignment layer is a planar alignment layer and the planar alignment direction is perpendicular to the planar alignment direction of the bistable alignment layer, the monostable alignment layer alternatively may be a vertical alignment layer, or the alignment direction of the monostable aliment layer may be parallel or at another angle to the direction of the bistable alignment layer.

Figure 2:
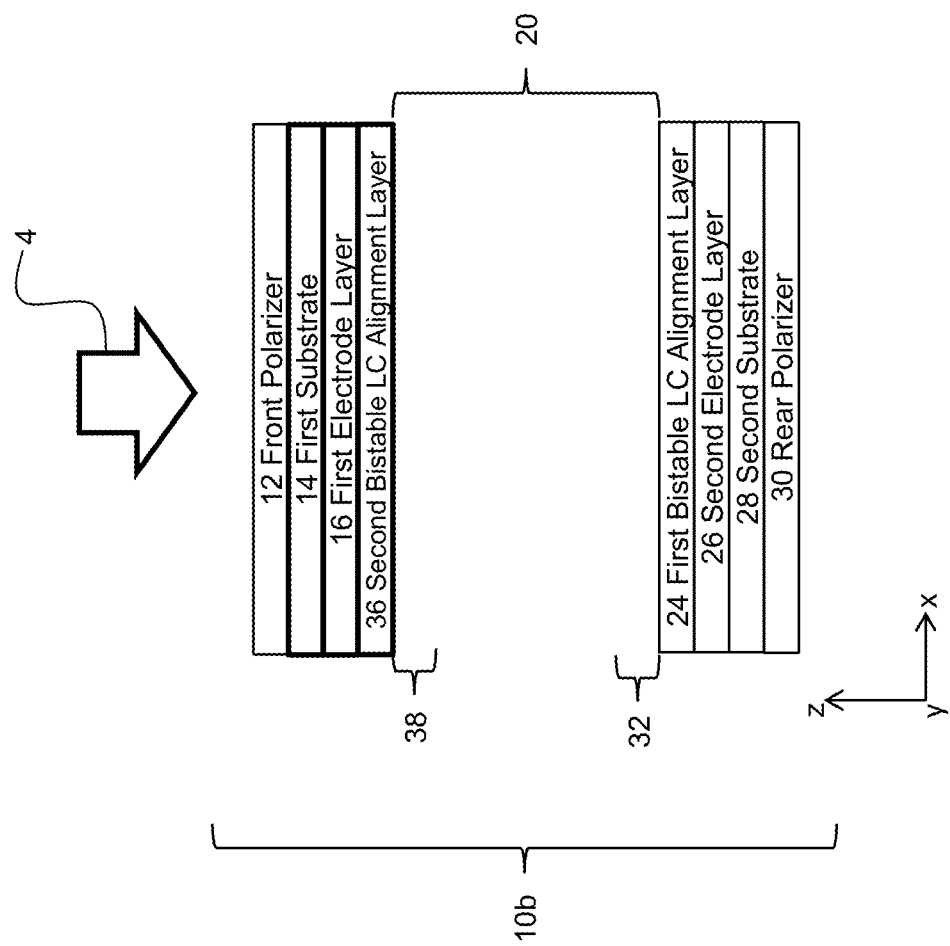
FIG. 2 is a schematic drawing depicting another LCD optical stack arrangement of an exemplary ZBD device.

FIG. 2 is a schematic drawing depicting another LCD optical stack arrangement of an exemplary zenithal bistable display device 10b. The device 10b has many comparable features as the device 10a of FIG. 1, and accordingly like components are identified with like reference numerals. Principally, in the structural arrangement of FIG. 2, the monostable LC alignment layer 18 has been replaced with a second bistable LC alignment layer 36 with a grating structure having an associated grating vector. The second bistable alignment layer 36 is operable to align the LC molecules in two different orientations in a region 38 adjacent to the surface of the second bistable alignment layer 36.

The use of two bistable LC alignment layers enables four stable LC configurations by a combination of alignments by the two bistable LC alignment layers 24 and 36 in the respective LC regions 32 and 38. A first LC configuration is a planar, non-twisted LC structure with a planar LC alignment induced by the first bistable LC alignment layer 24 and a planar LC alignment induced by the second bistable LC alignment layer 36. A second LC configuration is a hybrid aligned LC structure with a vertical LC alignment induced by the first bistable LC alignment layer 24 and a planar LC alignment induced by the second bistable LC alignment layer 36. A third LC configuration is another hybrid aligned LC structure with a planar LC alignment induced by the first bistable LC alignment layer 24 and a vertical LC alignment induced by the second bistable LC alignment layer 36 (basically the reverse of the second configuration). A fourth LC configuration is a vertically aligned LC structure with a vertical LC alignment induced by the first bistable LC alignment layer 24 and a vertical LC alignment induced by the second bistable LC alignment layer 36.

Figure 3:
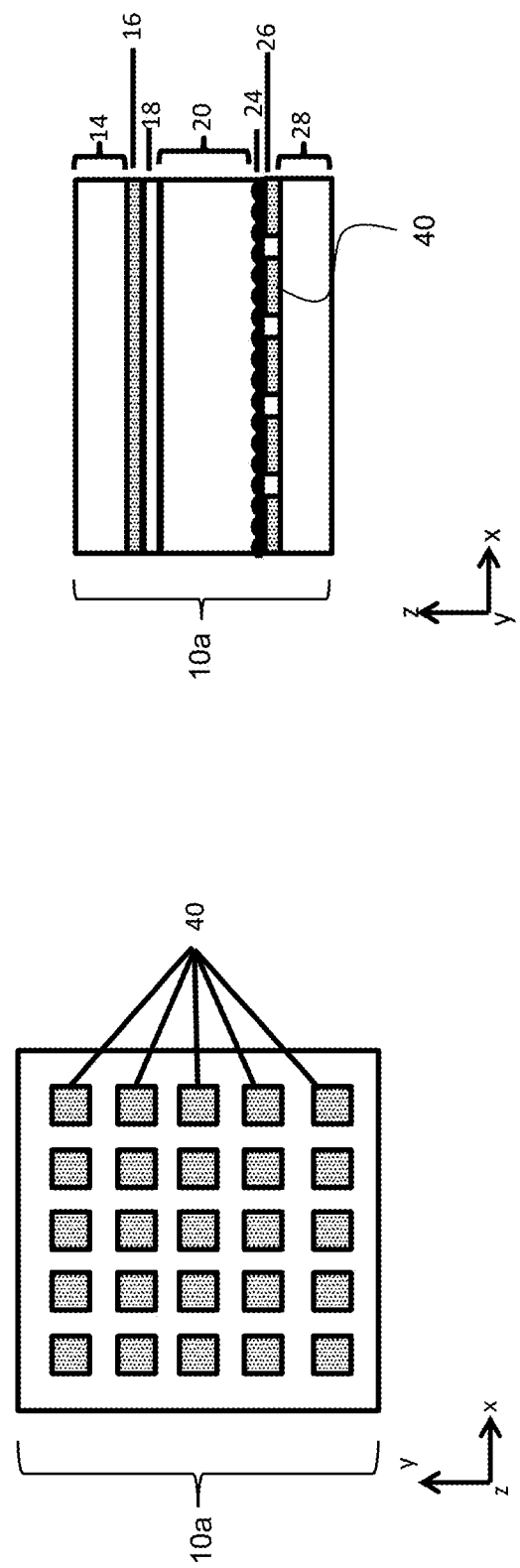
FIG. 3 is a schematic drawing depicting an alternative view of the exemplary ZBD device of FIG. 1, illustrating additional details as to the electrode structure.

FIG. 3 is a schematic drawing depicting an alternative view of the exemplary ZBD device 10a of FIG. 1 having one bistable alignment layer, illustrating additional details as to the electrode structure. It will be appreciated that a comparable electrode structure can be used in the exemplary ZBD device 10b of FIG. 2 having two bistable alignment layers. The right portion FIG. 3 depicts a side view of the optical stack arrangement (the polarizers are removed for simplicity), and the left portion of FIG. 3 is top view directed specifically at the second electrode layer 26.

As seen in FIG. 3, the second electrode layer 26 is configured as a segmented electrode layer, whereby the ZBD device is divided into individual pixels 40. Accordingly, the segmented electrode layer also may be referred to as the pixel electrode layer. The first electrode layer 16 is configured as a common electrode layer that spans across multiple pixels, although it will be appreciated that the positioning of the segmented electrode layer and the common electrode layer may be interchanged. Each pixel 40 is separately addressable based on driving voltages applied to the individual electrode segments by an addressing device or control chip, with the LC configuration of each pixel 40 resulting from a potential difference between the segmented electrode layer and the common electrode layer for each said pixel 40.

Figure 4:
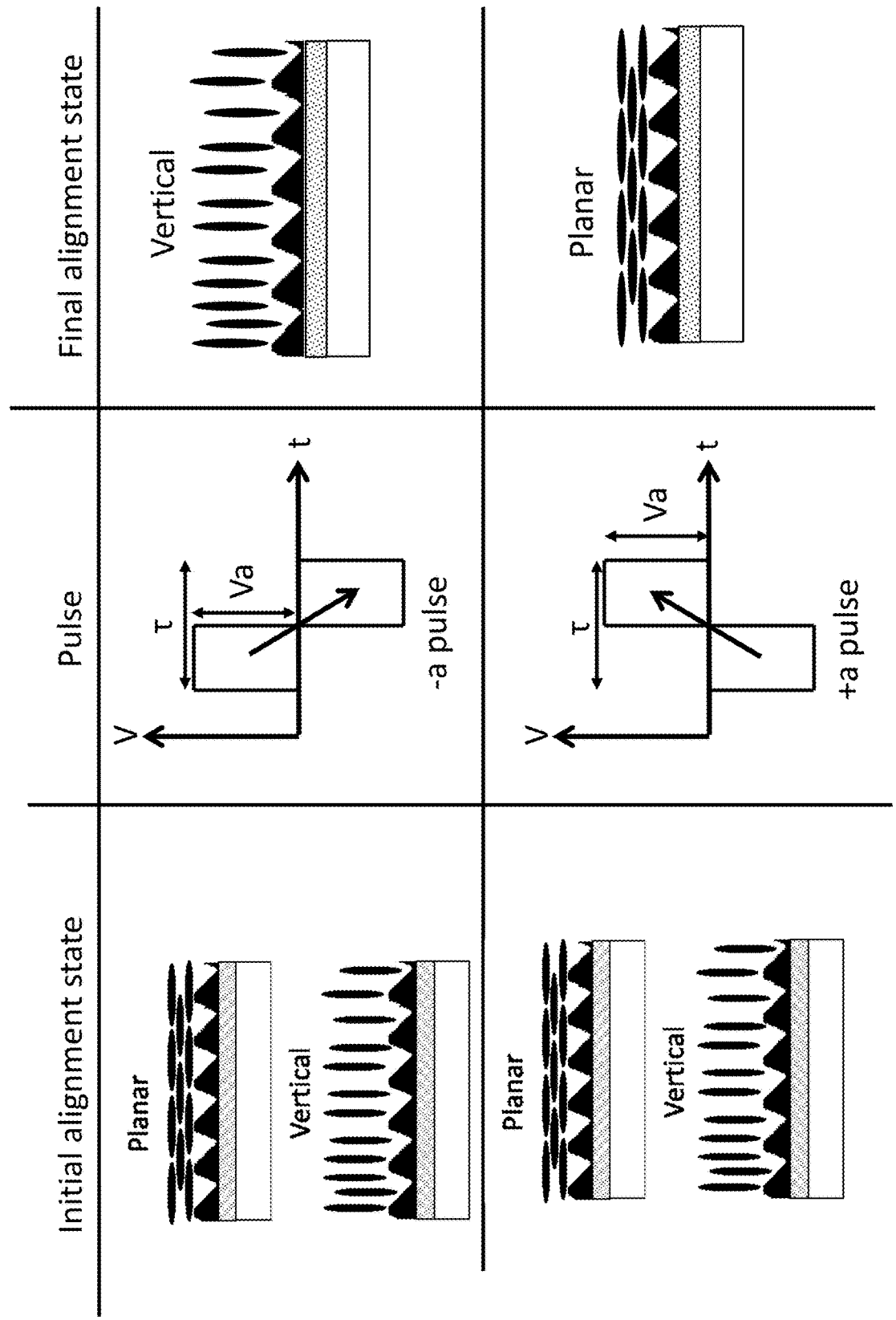
FIG. 4 is a schematic diagram illustrating how bistable alignment layers of the ZBD devices are switched between the planar and vertical alignment states.

FIG. 4 is a chart illustrating how bistable alignment layers of the ZBD devices are switched between the planar and vertical states. Generally, the bistable alignment layers are switched by the application of a bipolar charge balanced square wave voltage pulse applied to the pixel electrode, having a voltage magnitude Va and a period τ, where Va is a switching threshold voltage magnitude to switch between the stable states. To achieve the different stable states, therefore, the voltage of the two elements of the pulse are equal in magnitude and opposite in sign. A rising square wave voltage waveform is denoted a positive a-pulse (or "+a pulse"), and a falling square wave voltage waveform is denoted a negative a-pulse (or "−a pulse"). As understood by those of ordinary skill in the art, the sign of the pulse (− or +a pulse) is dependent on the electrode chosen for reference, i.e. a +pulse from the point of view of the upper electrode is a −pulse from the point of view of the lower electrode. It has been selected that the convention applicable in this disclosure is that the reference electrode is chosen such as a +pulse with magnitude "a" will change the lower threshold surface to a planar state.

The final alignment state at the bistable alignment layer is independent of the initial alignment state at the bistable alignment layer. In the example of FIG. 4, for a +a pulse that exceeds the switching threshold voltage Va in magnitude (top portion of FIG. 4), the final alignment state is vertical independent of the initial alignment state. Accordingly, when the initial alignment state is vertical, application of the +a pulse switches the LC configuration to the planar state, and when the initial alignment state is planar the LC configuration will remain planar. Conversely, for a −a pulse that exceeds the threshold voltage Va in magnitude (bottom portion of FIG. 4), the final alignment state is vertical independent of the initial alignment state. Accordingly, when the initial alignment state is planar, application of the −a pulse switches the LC configuration to the vertical state, and when the initial alignment state is vertical the LC configuration will remain vertical.

As is known in the art, in addition to a first switching threshold Va, a bistable alignment layer further may have a second switching threshold voltage that has a greater magnitude than the first switching threshold Va, denoted herein as Vc wherein Vc>Va. The second switching threshold Vc commonly is referred to as a "reverse latch" threshold, at which the bistable alignment layer switches to an opposing state. Accordingly, in the example of FIG. 4, for a +pulse a with voltage magnitude of Vc will result in a final alignment state that is vertical, and for a −pulse a voltage magnitude of Vc will result in a final alignment state that is planar.

In accordance with the above, FIG. 5 is a chart depicting pulse nomenclature for a single bistable alignment layer of a ZBD device. The initial letter "P" is simply an indication of a given pixel. As to the various subscripts, "X" denotes a no change in alignment (i.e., final state will be identical to original state), "V" denotes a vertical resultant alignment, and "P" denotes a planar resultant alignment. An underlined subscript denotes a reverse latch state, and a "+" or "−" denotes a +a pulse or −a pulse. With such nomenclature, the chart of FIG. 5 illustrates the effects of a pulse voltage "V" on the LC surface configuration at the single bistable alignment layer. In general, a pulse voltage having a magnitude that is lower than the switching threshold voltage Va will produce no change; a pulse voltage having a magnitude that is greater than the switching threshold voltage Va but lower than the reverse latch threshold Vc will produce a change from the initial state; and a pulse voltage having a magnitude that is greater than the reverse latch threshold Vc will produce a change where the final state is the other state than that given by a Va pulse. For example, a +Va pulse produces a resultant alignment of planar, and a +Vc pulse produces a resultant alignment which is vertical.

For a ZBD device having two bistable alignment layers, the second bistable alignment layer will operate comparably as above, except the second bistable alignment layer may have different threshold voltages, and for illustration purposes the second bistable alignment layer is designated to have threshold voltages that are greater than the threshold voltages of the first bistable alignment layer. For nomenclature, the second bistable alignment layer has a second switching threshold voltage Vb that is greater than the first switching threshold voltage Va of the first bistable alignment layer, or Vb>Va. Similarly, the second bistable alignment layer has a second reverse latch threshold voltage Vd that is greater than the first reverse latch threshold voltage Vc of the first bistable alignment layer, or Vd>Vc. In addition, it is common and preferable that the thresholds of the layers are such that Va<Vb<Vc<Vd. A preferred embodiment adheres to such relationship, although in principle the layers may be configurable with Vc<Vb.

In accordance with the above, FIG. 6 is a chart depicting pulse nomenclature of two bistable alignment layers of a ZBD device, including the first bistable alignment layer having the first switching threshold voltage Va and the first reverse latch threshold Vc (Lower Voltage Surface), and the second bistable alignment layer having the second switching threshold voltage Vb and the second reverse latch threshold Vd (Higher Voltage Surface). The nomenclature conventions otherwise are the same as with respect to the chart of FIG. 5. Because the chart of FIG. 6 relates to ZBD devices with two bistable alignment layers, the subscripts are double-lettered, with the first letter referring to the alignment state of the first (Lower Voltage Surface) bistable alignment layer and the second letter referring to the alignment state of the second (Higher Voltage Surface) bistable alignment layer. With such nomenclature, the chart of FIG. 6 illustrates the effects of a pulse voltage "V" on the LC surface configuration at the first and second bistable alignment layers.

As referenced above, conventional addressing devices (integrated circuit control chips) have proven to be deficient for driving ZBD devices because the available driving voltages that can be outputted from such devices are limited. Accordingly, conventional addressing devices or control chips may not have the scope of potential driving voltages to achieve each of the multiple LC configurations that otherwise could be achieved, and thus the corresponding multiple optical states are not fully realized. In contrast, the present invention realizes all bistable states of the LC configuration even under circumstances in which the ZBD device is driven by an addressing device that cannot operate at sufficiently high voltages to switch between each of the bistable states of the ZBD alignment layer or layers. Generally, this is achieved by applying a voltage pulse to the common electrode layer, which is modulated at the pixel electrode in such a manner so that all pixels respectively can be switched to any one of the stable states simultaneously.

For example, common addressing devices employ control chips that can provide +/−5V pulse (or less) to the segmented electrode of a pixel, while common switching threshold voltages for bistable alignment layers of ZBD cells are between 5V and 15V, with the reverse latch threshold voltages being commonly 25V or more. For example, in a dual bistable alignment layer ZBD cell that is within typical parameters, Va=8V, Vb=15V, Vc=20V or more, and Vd=25V or more. Consequently, it would be impossible to switch a ZBD cell between the various bistable states using such a conventional control chip with an output voltage of ±5V. In exemplary embodiments of the present invention, this deficiency is overcome by applying an additional pulse to all of the pixels via the common electrode layer, wherein a magnitude of the common electrode pulse is referred to herein as "Vcom", in addition to the driving voltage applied to the segmented pixel electrode of a given pixel, wherein a magnitude of the segmented electrode pulse is referred to herein a "Vseg". The combined pulse of Vseg and Vcom is referred to herein as the resultant pulse, or "Vres".

Figure 7:
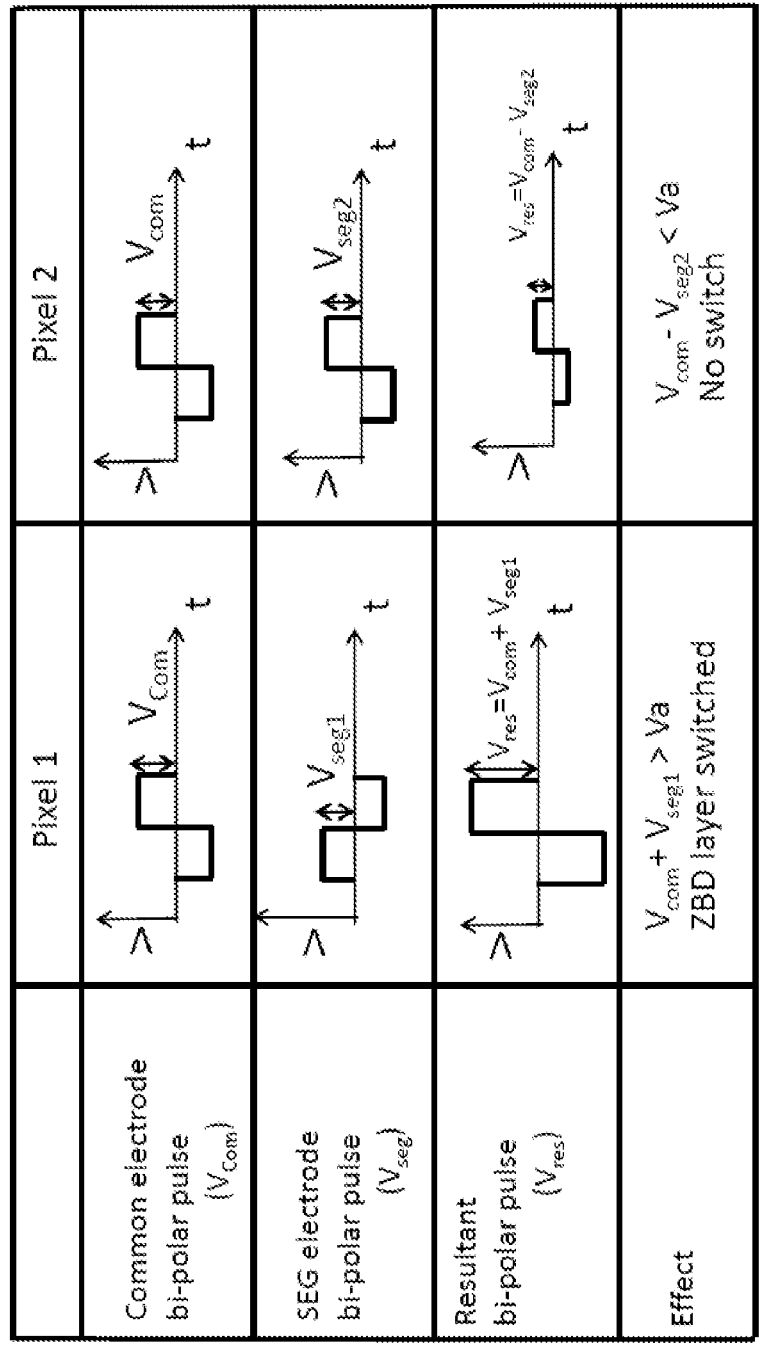
FIG. 7 is a chart depicting an overview of driving voltages for switching a bistable alignment layer in accordance with embodiments of the present invention.

FIG. 7 is a chart depicting an overview of driving voltages for switching a bistable alignment layer by employing a Vcom voltage applied to the common electrode in addition to a Vseg driving voltage applied to the segmented pixel electrodes. Two pixels denoted Pixel 1 and Pixel 2 are included for this example, although common principles may be applied to any number of pixels. The pixels have a given switching threshold voltage of Va. In this example, it is desired that Pixel 1 be switched into another stable state while Pixel 2 remain in the same stable state. The magnitude of the pulse that can be applied natively to the pixels via the segmented electrodes, Vseg, is less than the magnitude required to switch the ZBD to the other bistable state. Consequently, to provide for switching a magnitude of the pulse applied to the switching pixel (Pixel 1) needs to be increased to switch Pixel 1. This is done by applying an additional common pulse Vcom to all pixels via the common electrode, and then modulating this Vcom pulse on a pixel-by-pixel basis via the Vseg voltage applied to each pixel segmented electrode.

In the example of FIG. 7, a pulse Vcom is applied to the common electrode. On Pixel 1, a complementary pulse Vseg1 is applied to the segmented electrode (the waveforms applied to Pixel 1 are complementary because the segmented and common electrodes are on opposite sides of the alignment layers). On Pixel 2, a non-complementary pulse Vseg2 (similarly, the waveforms applied to Pixel 2 are non-complementary because the segmented and common electrodes are on opposite sides of the alignment layers). The results of the applied voltages is that on Pixel 1, the liquid crystal experiences a resultant pulse Vres of magnitude Vcom+Vseg1 that is greater than the switching threshold voltage, or Vres=Vcom+Vseg1>Va. Consequently, Pixel 1 is switched to another stable state. For Pixel 2, however, the liquid crystal experiences a resultant pulse Vres of magnitude Vcom−Vseg2, which is less than the switching threshold voltage, or Vres=Vcom−Vseg2<Va. Consequently, Pixel 2 remains in the same stable state. In this example, Vseg1 and Vseg2≠0, although this need not be the case. If Vcom is greater than Va then Vseg1 may be 0, and if Vcom is less than Va then Vseg2 may be 0. That being said, even if Vcom is greater than Va, it still may be beneficial to have Vseg1≠0, and if Vcom is less than Va it still may be beneficial to have Vseg2≠0.

When an addressing device includes a control chip that can provide a voltage range such that Vseg can apply both +Va and −Va pulses to different pixels (|Vseg|>2 Va), then there is no need to apply an additional pulse to the common electrode, and Vseg can be adjusted within the applicable voltage range of ±Va to achieve the desired stable states. As referenced above, however, conventional control chips may have limited output voltage ranges, and thus a +Vcom pulse or a −Vcom pulse may be employed to adjust the resultant voltage Vres applied to each pixel, said resultant voltage being Vseg+Vcom or Vseg−Vcom. In other words, when the control chip (as is often the case) cannot provide a voltage sufficient to apply both Va and −Va pulses to different pixels (|Vseg|<2Va), the voltage still may be sufficient to modulate a common pulse (Vcom) such that both the switching threshold voltage pulses and reverse latch pulses can be applied, i.e. |Vseg|>Vc−Va for a given bistable alignment layer.

An aspect of the invention, therefore, is an enhanced operating method of operating a display device to achieve combinations of stable states of bistable LC alignment layers in a ZBD device, by modulating an additional voltage pulse applied to the common electrode layer with the voltage pulse applied at the segmented pixel electrode layer. In exemplary embodiments, the operating method includes steps of: providing a liquid crystal device (LCD) comprising from the viewing side: a first electrode layer; a viewing side first liquid crystal (LC) alignment layer; an LC layer; a non-viewing side second LC alignment layer; and a second electrode layer; wherein one of the electrode layers is a common electrode layer and the other of the electrode layers is a segmented electrode layer, and at least one of the first and second LC alignment layers is a bistable alignment layer that is switchable between a first alignment state and a second alignment state; and applying a first voltage pulse to the segmented electrode layer and applying a second voltage pulse to the common electrode layer (Vcom pulse), the first and second voltage pulses combining to form a resultant voltage pulse; wherein the bistable alignment layer switches from the first alignment state to the second alignment state when a magnitude of the resultant voltage pulse exceeds a switching voltage threshold.

In accordance with such features, FIGS. 8-19 are various chart groupings depicting switching logic for achieving a full range of stable states for different control chip capabilities as associated with different types of ZBD devices (particularly ZBD devices having either a single bistable alignment layer or two bistable alignment layers). FIGS. 8-19 employ the nomenclature that was set forth in FIGS. 5-7. In each chart grouping, the top chart pertains to the control chip capabilities corresponding to accessible resultant pulse voltages, Vres, that may result from applying a positive or negative common electrode Vcom as modulated by the segmented electrode voltages Vseg. Generally, the accessible resultant pulse voltages, Vres, may include or be a subset of: (1) voltages below the switching threshold voltages (denoted by subscript "x"); (2) voltages above the switching threshold voltage that can switch stable states (denoted by subscript "p" or "v"); and (3) voltages above the reverse latch threshold voltages (denoted by subscript "p̲" or "v̲"). The signs plus or minus refer to the sign of the "-pulse" being positive or negative, as described above with respect to FIG. 4. Depending upon the set of accessible Vres voltages, different switching logic, i.e., order and set of pulses, must be applied to achieve each one of the LC configuration stable states. The logic presented in each of FIGS. 8-19 is not an exhaustive list of all possible pulse combinations, but representative sets of pulses are shown that are sufficient to achieve all applicable final stable states of the bistable alignment layer or layers.

In accordance with the above, FIG. 8 is a chart grouping depicting a first switching logic for a first set of accessible resultant voltages to be applied to the ZBD pixels. FIG. 8 in particular shows the switching logic for a ZBD cell with a single bistable alignment layer when the control chip can apply a voltage range of Vseg such that the resultant Vres pulses are available for a full range of $Px^+$ to $P\underline{v}^+$ and $Px^-$ to $P\underline{p}^-$. Essentially, FIG. 8 corresponds to an example in which the accessible Vres voltages encompass essentially the full range of voltages to switch the ZBD device into the various stable states. Accordingly, both planar (P) and vertical (V) states are achievable by applying only one or a single pulse regardless of the sign of the common pulse Vcom. Even though planar and vertical states of the ZBD can be achieved with either a positive or a negative Vcom pulse, it may be beneficial to alternate the sign of the Vcom pulse for independent frames to reduce degradation of the pixels, for example due to ion drift.

The example of FIG. 8 corresponds essentially to an ideal control chip capability, in which the accessible resultant pulses Vres span the full range of voltages for achieving the different stable states, regardless of the sign of the common pulse Vcom, and for both +a pulses and −a pulses of Vseg. In more typical control chips, the scope of accessible Vres is more limited, and thus a different switching logic may be required to achieve the various stable states. The following discussion, therefore, pertains to switching logic schemes when the control chip has more limited capabilities with respect to the accessible resultant voltages Vres.

FIG. 9 is a chart grouping depicting a second switching logic for a second set of accessible resultant voltages to be applied to the ZBD pixels. FIG. 9 in particular shows switching logic for a ZBD cell with a single bistable alignment layer when the control chip has accessible resultant voltages Vres in the range of; $Pp^+$ to $P\underline{v}^+$ and $Pv^-$ to $P\underline{p}^-$. The non-switching "x" magnitudes are not accessible for Vres in this example when modulating the Vom pulse. In this example, both planar (P) and vertical (V) states still are achievable after only one pulse, regardless of the sign of the common pulse. As a practical matter, the switching logic operates identically as the switching logic of FIG. 8. The Vres of Px+ and Px−, which are accessible in the example of FIG. 8 but not in the example of FIG. 9, constitute redundant voltages that do not bear on the actual operation.

FIG. 10 is a chart grouping depicting a third switching logic for a third set of accessible resultant voltages to be applied to the ZBD pixels. FIG. 10 in particular shows switching logic for a ZBD cell with a single bistable alignment layer when the control chip has accessible resultant voltages Vres in the range of $Px^+$ to $Pp^+$ and $Px^-$ to $Pv^-$. Accordingly, voltage magnitudes greater that the reverse latch threshold are not within the accessible resultant voltages Vres for this control chip. The example of FIG. 10 is more typical of practical circumstances, in that the reverse latch thresholds tend to be significantly higher than the capabilities of commonly used control chips.

Because of such limits on the accessible voltages Vres in this example, as depicted in FIG. 10 achieving both planar (P) and vertical (V) stales requires two pulses regardless of the sign of the first common pulse Vcom. For example, the middle chart of FIG. 10 illustrates the switching logic when the first common pulse is negative. As shown in Pulse Set 1, switching to a planar alignment is not achievable when Vcom is a negative pulse (Pulse 1), and thus a second positive Vcom pulse (Pulse 2) is required, which can be modulated by Vseg to result in a planar alignment state. In addition, as shown in Pulse Set 2, switching to a vertical alignment is achievable by modulating the initial negative Vcom pulse (Pulse 1), and then the positive second Vcom pulse (Pulse 2) is modulated to a Vres below the switching threshold (Px+) so that the vertical alignment state is maintained. The lower chart of FIG. 10 illustrates the switching logic when the first common pulse is positive. As shown in Pulse Set 1, switching to a planar alignment is achieved by modulating the initial positive Vcom pulse (Pulse 1), and the negative second Vcom pulse (Pulse 2) is modulated to a Vres below the switching threshold (Px−) so that the planar alignment state is maintained. In addition, as shown in Pulse Set 2, switching to a vertical alignment state is not achievable by modulating the initial positive Vcom pulse (Pulse) 1, and thus a negative second Vcom pulse (Pulse 2) is required, which can be modulated by Vseg to result in a vertical alignment state.

For ZBD devices including a single bistable alignment layer, therefore, the operating method may include setting a scope of accessible resultant voltage pulses such that a single resultant voltage pulse is required to achieve either stable state of the bistable alignment layer, or setting a scope of accessible resultant voltage pulses such that two resultant voltage pulses are required to achieve at least one stable state of the bistable alignment layer. The two-pulse driving schemes are particularly suitable when the control chip cannot natively output a Vres that can exceed the reverse latch threshold voltage.

The previous examples pertain to ZBD devices having a single bistable alignment layer. The switching logic implementation can be expanded to ZBD devices having two bistable alignment layers. Accordingly, in exemplary embodiments, the first LC alignment layer is a first bistable alignment layer and the second LC alignment layer is a second bistable alignment layer that are switchable between the first alignment state and the second alignment state. The first bistable alignment layer switches from the first alignment state to the second alignment state when a magnitude of the resultant voltage pulse exceeds a first switching voltage threshold, and the second bistable alignment layer switches from the first alignment state to the second alignment state when a magnitude of the resultant voltage pulse exceeds a second switching voltage threshold. In addition, the first bistable alignment layer switches from the second alignment state back to the first alignment state when the magnitude of the resultant voltage pulse exceeds a first reverse latch threshold that is greater than the first switching voltage threshold, and the second bistable alignment layer switches from the second alignment state back to the first alignment state when the magnitude of the resultant voltage pulse exceeds a second reverse latch threshold that is greater than the second switching voltage threshold. The second switching and second reverse latch threshold voltages respectively may be greater than the first switching and first reverse latch threshold voltages.

The switching logic implementation, as expanded to ZBD devices having two bistable alignment layers, is depicted in the charting groups of FIGS. 11-19. In accordance with the nomenclature as defined with respect to FIG. 6, the subscripts are double-lettered in such figures, with the first letter referring to the alignment state of the first (e.g., Lower Voltage Surface) bistable alignment layer, and the second letter referring to the alignment state of the second (e.g., Higher Voltage Surface) bistable alignment layer. As detailed above, with two bistable alignment layers, four stable LC configurations or alignment states are achievable with the different combinations of alignment states of the two layers: vertical-planar (VP), vertical-vertical (VV), planar-vertical (PV), and planar-planar (PP). The examples of FIGS. 11-19 illustrate different switching logic to achieve the four stable alignment states, considering various capabilities of a given control chip to achieve different sets of accessible resultant voltages Vres. Again, the logic presented in each of FIGS. 11-19 is not an exhaustive list of all possible pulse combinations, but representative sets of pulses are shown that are sufficient to achieve the four all applicable final stable states of the dual bistable alignment layers.

FIG. 11 is a chart grouping depicting a fourth switching logic for a fourth set of accessible resultant voltages to be applied to the ZBD pixels. FIG. 11 in particular shows the switching logic for a ZBD cell with two bistable alignment layers when the control chip can apply a voltage range of Vseg such that the resultant Vres pulses are available for a wide range of Pxx$^+$ to Pvp$^+$ and Pxx$^-$ to P$_{PV}^{--}$. Essentially, FIG. 11 (similarly to FIG. 8 for single layer devices) corresponds to an example in which the Vres voltages encompass essentially the full range of voltages to switch the ZBD device into the various stable states. With two bistable alignment layers, all four of the dual layer stable states (VP, VV, PV, and PP) are achievable by applying two pulses regardless of the sign of the initial common pulse Vcom. The chart grouping of FIG. 11 is understood comparably as the two-pulse sets of FIG. 10. The reference to "N/A" of Pulse 1 indicates that the corresponding final state would not be achievable with a Vcom of that particular sign, and the adequate Vres may then be achieved with a Vcom pulse of the opposite sign as indicated in the Pulse 2 block.

In contrast, the PP state with a negative initial Vcom pulse, and the VV state with a positive initial Vcom pulse, require two pulses to achieve such states, by which one bistable alignment layer is switched at a time. For example, looking at Pulse Set 4 of the middle chart employing an initial pulse (Pulse 1) that includes a negative Vcom pulse, Pulse 1—Pvp– sets the first bistable alignment layer to vertical and the second bistable alignment layer to planar. Pulse 2—Ppx+ then changes the first bistable alignment layer to planar while maintaining the second bistable alignment layer as planar, to achieve the final state PP. Similarly, looking at Pulse Set 2 of the lower chart employing an initial pulse (Pulse 1) that includes a positive Vcom pulse, Pulse 1—Ppv+ sets the first bistable alignment layer to planar and the second bistable alignment layer to vertical. Pulse 2—Pvx– then maintains the second bistable alignment layer as vertical while changing the first bistable alignment layer to vertical, to achieve the final state VV.

Lile FIG. 8, the example of FIG. 11 corresponds essentially to an ideal control chip capability, in which the accessible resultant pulses Vres span a wide range of voltages for achieving the different stable states, regardless of the sign of the common pulse Vcom, and for both +a pulses and –a pulses of Vseg. As referenced above, in more typical control chips, the scope of accessible Vres is more limited, and thus a different switching logic may be required to achieve the various stable states. The following discussion, therefore, pertains to switching logic schemes when the control chip has different, and sometimes more limited, capabilities with respect to the accessible resultant voltages Vres, and for a ZBD device that includes two bistable alignment layers. The following charting groups share nomenclature and may be understood comparably as FIG. 11.

FIG. 12 is a chart grouping depicting a fifth switching logic for a fifth set of accessible resultant voltages to be applied to the ZBD pixels. FIG. 12 in particular shows the switching logic for a ZBD cell with two bistable alignment layer when the control chip can apply a voltage range of Vseg such that the resultant Vres pulses are available for a range of Pxx– to P$_{VV}^+$ and P$_{XX}^+$ to P$_{PP}^-$. Pulse sets again are shown for driving schemes in which the initial pulse, Pulse 1, includes a negative Vcom pulse followed by a second pulse, Pulse 2, including a positive Vcom pulse, (middle chart), and in which the initial pulse, Pulse 1, includes a positive Vcom pulse followed by a second pulse, Pulse 2, including a negative Vcom pulse (lower chart). The reference to "N/A" of Pulse 1 again indicates that the corresponding final state would not be achievable with a Vcom of that particular sign, and the adequate Vres may then be achieved with a Vcom pulse of the opposite sign as indicated in the Pulse 2 block. Others of the pulse sets utilize a two-pulse set that results in the applicable final state. By comparing FIG. 12 to the other charting groupings, the different scopes of accessible Vres achievable by a given control chip results in a different switching logic to achieve each of the four stable states.

FIGS. 13 and 14 are drawings depicting charting groups that likewise have ranges of accessible Vres that can employ a two-pulse driving scheme to achieve each of the stable states, with the two pulses in each pulse set including opposite sign Vcoms. In particular, FIG. 13 is a chart grouping depicting a sixth switching logic for a sixth set of accessible resultant voltages to be applied to the ZBD pixels, in which the control chip can apply a voltage range of Vseg such that the resultant Vres pulses are available for a range of P$_{PX}^+$ to P$_{VP}^+$ and P$_{VX}^-$ to P$_{PV}^-$. FIG. 14 is a chart grouping depicting a seventh switching logic for a seventh set of accessible resultant voltages to be applied to the ZBD pixels, in which the control chip can apply a voltage range of Vseg such that the resultant Vres pulses are available for a range of P$_{XX}^+$ to P$_{VV}^+$ and P$_{XX}^-$ to P$_{PP}^-$. In comparing FIGS. 11-14, the differences in scope of the accessible resultant voltages Vres determine the precise two-pulse switching logic to achieve each of the four stable state combinations of the two bistable alignment layers.

Depending upon the scope or range of the accessible Vres of the control chip, a three-pulse switching logic may be required to achieve each of the four stable state combinations of the two bistable alignment layers. When a three-pulse switching logic is employed, the sign of the Vcom pulse switches with each pulse. Accordingly, when the initial pulse includes a positive Vcom pulse, the second pulse includes a negative Vcom pulse and the third pulse includes a positive Vcom pulse. Likewise, when the initial pulse includes a negative Vcom pulse, the second pulse includes a positive Vcom pulse and the third pulse includes a negative Vcom pulse. FIGS. 15 and 16 are drawings depicting charting groups that have ranges of accessible Vres that can employ a three-pulse switching logic to achieve each of the four stable state combinations. In particular, FIG. 15 is a chart grouping depicting an eighth switching logic for an eighth set of accessible resultant voltages to be applied to the ZBD pixels, in which the control chip can apply a voltage range of Vseg such that the resultant Vres pulses are available for a range of Pvx$^-$ to Ppv$^+$ and Ppx$^+$ to P$_{VP}^-$. FIG. 16 is a chart grouping depicting a ninth switching logic for a ninth set of accessible resultant voltages to be applied to the ZBD pixels, in which the control chip can apply a voltage range of Vseg such that the resultant Vres pulses are available for a range of P$_{XX}^+$ to P$_{PV}^+$ and P$_{XX}^-$ to P$_{VP}^-$. In comparing FIGS. 15 and 16, the differences in scope of the accessible resultant voltages Vres determine the precise three-pulse switching logic to achieve each of the four stable state combinations of the two bistable alignment layers.

The switching logic of FIGS. 15 and 16 would tend to be more applicable to practical circumstances that typically occur, as compared to the switching logic examples of FIGS. 11-14. In the examples of FIGS. 15 and 16, voltage magnitudes greater that the reverse latch threshold are not within the accessible resultant voltages Vres for these control chips. The examples of FIGS. 15 and 16 are more typical of practical circumstances, in that the reverse latch thresholds tend to be significantly higher than the capabilities of commonly used control chips.

For ZBD devices including first and second bistable alignment layers, therefore, the operating method may include setting a scope of accessible resultant voltage pulses such that two resultant voltage pulses are required to achieve any one of four stable state combinations of the first bistable alignment layer and the second bistable alignment layer, or setting a scope of accessible resultant voltage pulses such that three resultant voltage pulses are required to achieve at least one of the four stable state combinations of the first bistable alignment layer and the second bistable alignment layer. The three-pulse driving schemes are particularly suitable when the control chip cannot natively output a Vres that can exceed the reverse latch threshold voltages as to each of the two bistable alignment layers.

For common control chips, the limited range of output voltages may render the various states unachievable through modulation of a single magnitude of a Vcom pulse. For example, if Va=7V and Vb=13V, with the chip output maximized at ±4V and a typical Vcom of ±6V, the Va switching threshold is achievable but the Vb switching threshold is not. To overcome such issue, a Vcom may be applied at more than one voltage pulse, e.g., at a first common electrode voltage pulse V1com and a second common electrode voltage pulse V2com. These common pulses are applied homogeneously to the ZBD cell in a comparable fashion as in the previous examples. For example, a V1com of ±12V may be applied to exceed Vb, and a Vcom2 of ±6V may be applied to exceed Va. With application of the common electrode voltage at either V1com or V2com, the three-pulse switching logic of the previous examples may be modified, such that Pulse 1 and Pulse 2 include V1com and Pulse 3 includes V2com, with the sign of the Vcom pulse again alternating with each pulse and |V1com|>|V2com|. Such an example tends to correspond more with practical circumstances typically encountered as to the capabilities of conventional control chips that cannot natively output voltages suitable to exceed the multiple threshold voltages of the bistable alignment layers.

Accordingly, FIG. 17 is a drawing depicting charting groups that have ranges of accessible Vres that employ a three-pulse switching logic, further with the common electrode voltage being either V1com or V2com as set forth above. In particular, FIG. 17 is a chart grouping depicting a tenth switching logic for a tenth set of accessible resultant voltages to be applied to the ZBD pixels, in which the control chip can apply a voltage range of Vseg such that the resultant Vres pulses are available for a range of $P_{PX}^+$ and $P_{PV}^+$ as well as $P_{VX}^-$ and $P_{VP}^-$. For this example control chip, essentially the control chip can apply a voltage such that only two resultant pluses are possible. To achieve all final states, the two different Vcom pulses are needed. The first two Vcom pulses in the pulse sets have the magnitude V1com, and this voltage can be modulated by the pixel electrode voltage Vseg such that the following Vres pulses are available; $P_{PX}^+$ and $P_{PV}^+$ as well as $P_{VX}^-$ and $P_{VP}^-$. The final Vcom pulse in the pulse set has a magnitude V2com, and this voltage can be modulated by the pixel electrode voltage Vseg so that the following Vres pulses are available; $P_{XX}^+$ and $P_{PX}^+$ as well as $P_{XX}^-$ and $P_{VX}^-$ As referenced above, the three-pulse switching logic is applied such that Pulse 1 and Pulse 2 include V1com 1 and Pulse 3 includes V2com, with the sign of the Vcom pulse again alternating with each pulse and |V1com|>|V2com|. With such switching logic, each of the four stable state combinations of the two bistable alignment layers is achieved.

FIGS. 18 and 19 depict additional examples with limited scopes of Vres, with employing different Vcom magnitudes to achieve each of the four stable state combinations. FIG. 18 is a chart grouping depicting an eleventh switching logic for an eleventh set of accessible resultant voltages to be applied to the ZBD pixels, in which the control chip can apply a voltage range of Vseg such that the resultant Vres pulses are available for a range of $P_{PV}^+$ to $P_{VP}^+$ and $P_{VP}^-$ to $P_{PV}^-$. FIG. 19 is a chart grouping depicting a twelfth eleventh switching logic for a twelfth set of accessible resultant voltages to be applied to the ZBD pixels, in which the control chip can apply a voltage range of Vseg such that the resultant Vres pulses are available for a range of $P_{VP}^+$ and $P_{VV}^+$ as well as $P_{PV}^-$ and $P_{PP}^-$. In comparing FIGS. 17-19, the differences in scope of the accessible resultant voltages Vres determine the precise three-pulse switching logic to achieve each of the four stable state combinations of the two bistable alignment layers.

FIG. 20 is a drawing depicting a block diagram of an exemplary display control system 60 in accordance with embodiments of the present invention. The display control system 60 includes a main control unit 62 that provides overall control of a driving scheme for an associated display system. The main control unit 60 in particular may supply command signals that control the voltage inputs in accordance with any of the switching logic embodiments described above. The main control unit 60 may supply command signals to a pixel voltage control chip 64 that supplies the driving voltages (Vseg) to the segmented pixel electrodes 16 for the pixels 40 (see FIG. 3), and to a Vcom voltage control chip 66 that supplies the driving voltages (Vcom) to the common electrodes 26. The main control unit 62 may include suitable circuitry and/or processing device(s) 68 that are configured to carry out various control operations relating to control of the voltage control chips 64 and 66 to implement the embodiments of the switching logic.

Accordingly, to implement the features of the present invention, the main control unit 62 may employ the processing device 68 to execute program code embodied as a control application stored within a storage device 70 to implement the embodiments of the switching logic. It will be apparent to a person having ordinary skill in the art of computer programming, and specifically in application programming for electronic control devices, how to program the main control unit to operate and carry out logical functions associated with the stored control application. Accordingly, details as to specific programming code have been left out for the sake of brevity. The storage device 70 may be configured as a non-transitory computer readable medium, such as random access memory (RAM), a read-only memory (ROM), an erasable programmable read-only memory (EPROM or Flash memory), or any other suitable computer-readable medium. Also, while the program code may be executed by control processing devices 68 in accordance with an exemplary embodiment, such control system functionality could also be carried out via dedicated hardware, firmware, software, or combinations thereof, without departing from the scope of the invention. In addition, although processing device 68 and the storage device 70 including the program code are illustrated as part of the main control unit 60, such components may be integrated or separate components as may be suitable for any particular application.

An aspect of the invention, therefore, is an enhanced operating method of operating a display device to achieve combinations of stable states of bistable LC alignment layers in a ZBD device, by modulating an additional voltage pulse applied to the common electrode layer with the voltage pulse applied at the segmented pixel electrode layer. In exemplary embodiments, the operating method includes steps of: providing a liquid crystal device (LCD) comprising from the viewing side: a first electrode layer; a viewing side first liquid crystal (LC) alignment layer; an LC layer; a non-viewing side second LC alignment layer; and a second electrode layer; wherein one of the electrode layers is a common electrode layer and the other of the electrode layers is a segmented electrode layer, and at least one of the first and second LC alignment layers is a bistable alignment layer that is switchable between a first alignment state and a second alignment state; and applying a first voltage pulse to the segmented electrode layer and applying a second voltage pulse to the common electrode layer (Vcom pulse), the first and second voltage pulses combining to form a resultant voltage pulse; wherein the bistable alignment layer switches from the first alignment state to the second alignment state when a magnitude of the resultant voltage pulse exceeds a switching voltage threshold. The operating method may include one or more of the following features, either individually or in combination.

In an exemplary embodiment of the operating method, the first alignment state is a planar alignment state and the second alignment state is a vertical alignment state, and the bistable alignment layer switches from the first alignment state to the second alignment state when the resultant voltage pulse is a positive a-pulse having a magnitude that exceeds the switching voltage threshold.

In an exemplary embodiment of the operating method, the first alignment state is vertical alignment state and the second alignment state is a planar alignment state, and the bistable alignment layer switches from the first alignment state to the second alignment state when the resultant voltage pulse is a negative a-pulse having a magnitude that exceeds the switching voltage threshold.

In an exemplary embodiment of the operating method, the bistable alignment layer switches from the second alignment state back to the first alignment state when the magnitude of the resultant voltage pulse exceeds a reverse latch threshold that is greater than the switching voltage threshold.

In an exemplary embodiment of the operating method, the operating method further includes applying a first Vcom pulse as the second pulse that combines with the first pulse to form a first resultant voltage pulse, wherein a magnitude of the first resultant voltage pulse exceeds the switching threshold voltage; and applying a second Vcom pulse having a magnitude greater than the first Vcom pulse as the second pulse that combines with the first pulse to form a second resultant voltage pulse, wherein a magnitude of the second resultant voltage pulse exceeds the reverse latch threshold.

In an exemplary embodiment of the operating method, the operating method further includes setting a scope of accessible resultant voltage pulses such that a single resultant voltage pulse is required to achieve either stable state of the bistable alignment layer.

In an exemplary embodiment of the operating method, the operating method further includes setting a scope of accessible resultant voltage pulses such that two resultant voltage pulses are required to achieve at least one stable state of the bistable alignment layer.

In an exemplary embodiment of the operating method, the first LC alignment layer is a first bistable alignment layer and the second LC alignment layer is a second bistable alignment layer that are switchable between the first alignment state and the second alignment state; and the first bistable alignment layer switches from the first alignment state to the second alignment state when a magnitude of the resultant voltage pulse exceeds a first switching voltage threshold, and the second bistable alignment layer switches from the first alignment state to the second alignment state when a magnitude of the resultant voltage pulse exceeds a second switching voltage threshold.

In an exemplary embodiment of the operating method, the second switching threshold voltage is greater than the first switching threshold voltage.

In an exemplary embodiment of the operating method, the first bistable alignment layer switches from the second alignment state back to the first alignment state when the magnitude of the resultant voltage pulse exceeds a first reverse latch threshold that is greater than the first switching voltage threshold, and the second bistable alignment layer switches from the second alignment state back to the first alignment state when the magnitude of the resultant voltage pulse exceeds a second reverse latch threshold that is greater than the second switching voltage threshold.

In an exemplary embodiment of the operating method, the second reverse latch threshold is greater than the first reverse latch threshold.

In an exemplary embodiment of the operating method, the first switching threshold voltage<the second switching threshold voltage<the first reverse latch threshold<the second reverse latch threshold.

In an exemplary embodiment of the operating method, the operating method further includes applying a first Vcom pulse as the second pulse that combines with the first pulse to form a first resultant voltage pulse, wherein a magnitude of the first resultant voltage pulse exceeds one or both of the first and second switching threshold voltages; and applying a second Vcom pulse that has a magnitude greater than the first Vcom pulse as the second pulse that combines with the first pulse to form a second resultant voltage pulse, wherein a magnitude of the second resultant voltage pulse exceeds one or both of the first and second reverse latch thresholds.

In an exemplary embodiment of the operating method, the first alignment state is a planar alignment state and the second alignment state is a vertical alignment state, and the first and second bistable alignment layers switch from the first alignment state to the second alignment state when the resultant voltage pulse is a positive a-pulse having a magnitude that exceeds the first and/or second switching voltage thresholds.

In an exemplary embodiment of the operating method, the first alignment state is a vertical alignment state and the second alignment state is a planar alignment state, and the first and second bistable alignment layers switch from the first alignment state to the second alignment state when the resultant voltage pulse is a negative a-pulse having a magnitude that exceeds the first and/or second switching voltage thresholds.

In an exemplary embodiment of the operating method, the operating method further includes setting a scope of accessible resultant voltage pulses such that two resultant voltage pulses are required to achieve any one of four stable state combinations of the first bistable alignment layer and the second bistable alignment layer.

In an exemplary embodiment of the operating method, the operating method further includes setting a scope of accessible resultant voltage pulses such that three resultant voltage pulses are required to achieve at least one of four stable state combinations of the first bistable alignment layer and the second bistable alignment layer.

Another aspect of the invention is a display system that operates in accordance with the enhanced method of operating. In exemplary embodiments, the display system includes a liquid crystal device (LCD) comprising from the viewing side: a first electrode layer; a viewing side first liquid crystal (LC) alignment layer; an LC layer; a non-viewing side second LC alignment layer; and a second electrode layer; wherein one of the electrode layers is a common electrode layer and the other of the electrode layers is a segmented electrode layer, and at least one of the first and second LC alignment layers is a bistable alignment layer that is switchable between a first alignment state and a second alignment state. The display system further includes control circuitry configured to apply a first voltage pulse to the segmented electrode layer and apply a second voltage pulse to the common electrode layer (Vcom pulse), the first and second voltage pulses combining to form a resultant voltage pulse; wherein the bistable alignment layer switches from the first alignment state to the second alignment state when a magnitude of the resultant voltage pulse exceeds a switching voltage threshold. The display system may include one or more of the following features, either individually or in combination.

In an exemplary embodiment of the display system, the first alignment state is a planar alignment state and the second alignment state is a vertical alignment state, and the bistable alignment layer switches from the first alignment state to the second alignment state when the resultant voltage pulse is a positive a-pulse having a magnitude that exceeds the switching voltage threshold, or the first alignment state is vertical alignment state and the second alignment state is a planar alignment state, and the bistable alignment layer switches from the first alignment state to the second alignment state when the resultant voltage pulse is a negative a-pulse having a magnitude that exceeds the switching voltage threshold.

In an exemplary embodiment of the display system, the first LC alignment layer is a first bistable alignment layer and the second LC alignment layer is a second bistable alignment layer that are switchable between the first alignment state and the second alignment state; and the first bistable alignment layer switches from the first alignment state to the second alignment state when a magnitude of the resultant voltage pulse exceeds a first switching voltage threshold, and the second bistable alignment layer switches from the first alignment state to the second alignment state when a magnitude of the resultant voltage pulse exceeds a second switching voltage threshold.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices in which an enhanced display appearance and usage may be desirable, including portable electronic display devices. Examples of such devices include mobile phones including smartphones, personal digital assistants (PDAs), and tablet and laptop computers.

REFERENCE SIGNS LIST

4—viewing direction
10a—exemplary zenithal bistable display device
10b—exemplary zenithal bistable display device
12—front polarizer
14—first substrate
16—first electrode layer
18—monostable LC alignment layer
20—LC layer
22—individual LC molecules
24—bistable alignment layer
26—second electrode layer
28—second substrate
30—rear polarizer
32—region adjacent first alignment layer
36—second bistable LC alignment layer
38—region adjacent second alignment layer
40—individual pixels
60—display control system
62—main control unit
64—pixel voltage control chip
66—Vcom voltage control chip
68—circuitry and/or processing device(s)
70—storage device

What is claimed is:

1. An operating method of operating a display device comprising the steps of:
  providing a liquid crystal device (LCD) comprising from the viewing side:
    a first electrode layer; a viewing side first liquid crystal (LC) alignment layer; an LC layer; a non-viewing side second LC alignment layer; and a second electrode layer;
    wherein one of the electrode layers is a common electrode layer and the other of the electrode layers is a segmented electrode layer, and at least one of the first and second LC alignment layers is a bistable alignment layer that is switchable between a first alignment state and a second alignment state; and
  applying a first voltage pulse to the segmented electrode layer and applying a second voltage pulse to the common electrode layer (Vcom pulse), the first and second voltage pulses combining to form a resultant voltage pulse;
  wherein the bistable alignment layer switches from the first alignment state to the second alignment state when a magnitude of the resultant voltage pulse exceeds a switching voltage threshold;

wherein the first LC alignment layer is a first bistable alignment layer and the second LC alignment layer is a second bistable alignment layer that are switchable between the first alignment state and the second alignment state; and wherein the first bistable alignment layer switches from the first alignment state to the second alignment state when a magnitude of the resultant voltage pulse exceeds a first switching voltage threshold, and the second bistable alignment layer switches from the first alignment state to the second alignment state when a magnitude of the resultant voltage pulse exceeds a second switching voltage threshold.

2. The operating method of claim 1, wherein the first alignment state is a planar alignment state and the second alignment state is a vertical alignment state, and the bistable alignment layer switches from the first alignment state to the second alignment state when the resultant voltage pulse is a positive a-pulse having a magnitude that exceeds the switching voltage threshold.

3. The operating method of claim 1, wherein the first alignment state is vertical alignment state and the second alignment state is a planar alignment state, and the bistable alignment layer switches from the first alignment state to the second alignment state when the resultant voltage pulse is a negative a-pulse having a magnitude that exceeds the switching voltage threshold.

4. The operating method of claim 1, further comprising setting a scope of accessible resultant voltage pulses such that a single resultant voltage pulse is required to achieve either stable state of the bistable alignment layer.

5. The operating method of claim 1, further comprising setting a scope of accessible resultant voltage pulses such that two resultant voltage pulses are required to achieve at least one stable state of the bistable alignment layer.

6. The operating method of claim 1, wherein the second switching threshold voltage is greater than the first switching threshold voltage.

7. The operating method of claim 1, wherein the first bistable alignment layer switches from the second alignment state back to the first alignment state when the magnitude of the resultant voltage pulse exceeds a first reverse latch threshold that is greater than the first switching voltage threshold, and the second bistable alignment layer switches from the second alignment state back to the first alignment state when the magnitude of the resultant voltage pulse exceeds a second reverse latch threshold that is greater than the second switching voltage threshold.

8. The operating method of claim 7, wherein the second reverse latch threshold is greater than the first reverse latch threshold.

9. The operating method of claim 8, wherein:
the first switching threshold voltage<the second switching threshold voltage<the first reverse latch threshold<the second reverse latch threshold.

10. The operating method of claim 7, further comprising:
applying a first Vcom pulse as the second pulse that combines with the first pulse to form a first resultant voltage pulse, wherein a magnitude of the first resultant voltage pulse exceeds one or both of the first and second switching threshold voltages; and
applying a second Vcom pulse that has a magnitude greater than the first Vcom pulse as the second pulse that combines with the first pulse to form a second resultant voltage pulse, wherein a magnitude of the second resultant voltage pulse exceeds one or both of the first and second reverse latch thresholds.

11. The operating method of claim 1, wherein the first alignment state is a planar alignment state and the second alignment state is a vertical alignment state, and the first and second bistable alignment layers switch from the first alignment state to the second alignment state when the resultant voltage pulse is a positive a-pulse having a magnitude that exceeds the first and/or second switching voltage thresholds.

12. The operating method of claim 1, wherein the first alignment state is a vertical alignment state and the second alignment state is a planar alignment state, and the first and second bistable alignment layers switch from the first alignment state to the second alignment state when the resultant voltage pulse is a negative a-pulse having a magnitude that exceeds the first and/or second switching voltage thresholds.

13. The operating method of claim 1, further comprising setting a scope of accessible resultant voltage pulses such that two resultant voltage pulses are required to achieve any one of four stable state combinations of the first bistable alignment layer and the second bistable alignment layer.

14. The operating method of claim 1, further comprising setting a scope of accessible resultant voltage pulses such that three resultant voltage pulses are required to achieve at least one of four stable state combinations of the first bistable alignment layer and the second bistable alignment layer.

15. A display system comprising:
a liquid crystal device (LCD) comprising from the viewing side:
a first electrode layer; a viewing side first liquid crystal (LC) alignment layer; an LC layer; a non-viewing side second LC alignment layer; and a second electrode layer;
wherein one of the electrode layers is a common electrode layer and the other of the electrode layers is a segmented electrode layer, and at least one of the first and second LC alignment layers is a bistable alignment layer that is switchable between a first alignment state and a second alignment state; and
control circuitry configured to apply a first voltage pulse to the segmented electrode layer and apply a second voltage pulse to the common electrode layer (Vcom pulse), the first and second voltage pulses combining to form a resultant voltage pulse;
wherein the bistable alignment layer switches from the first alignment state to the second alignment state when a magnitude of the resultant voltage pulse exceeds a switching voltage threshold;
wherein the first LC alignment layer is a first bistable alignment layer and the second LC alignment layer is a second bistable alignment layer that are switchable between the first alignment state and the second alignment state; and
wherein the first bistable alignment layer switches from the first alignment state to the second alignment state when a magnitude of the resultant voltage pulse exceeds a first switching voltage threshold, and the second bistable alignment layer switches from the first alignment state to the second alignment state when a magnitude of the resultant voltage pulse exceeds a second switching voltage threshold.

16. The display system of claim 15, wherein the first alignment state is a planar alignment state and the second alignment state is a vertical alignment state, and the bistable alignment layer switches from the first alignment state to the second alignment state when the resultant voltage pulse is a positive a-pulse having a magnitude that exceeds the switching voltage threshold, or wherein the first alignment state is vertical alignment state and the second alignment state is a planar alignment state, and the bistable alignment layer switches from the first alignment state to the second alignment state when the resultant voltage pulse is a negative a-pulse having a magnitude that exceeds the switching voltage threshold.

17. An operating method of operating a display device comprising the steps of:

providing a liquid crystal device (LCD) comprising from the viewing side:

a first electrode layer; a viewing side first liquid crystal (LC) alignment layer; an LC layer; a non-viewing side second LC alignment layer; and a second electrode layer;

wherein one of the electrode layers is a common electrode layer and the other of the electrode layers is a segmented electrode layer, and at least one of the first and second LC alignment layers is a bistable alignment layer that is switchable between a first alignment state and a second alignment state; and applying a first voltage pulse to the segmented electrode layer and applying a second voltage pulse to the common electrode layer (Vcom pulse), the first and second voltage pulses combining to form a resultant voltage pulse;

wherein the bistable alignment layer switches from the first alignment state to the second alignment state when a magnitude of the resultant voltage pulse exceeds a switching voltage threshold;

wherein the bistable alignment layer switches from the second alignment state back to the first alignment state when the magnitude of the resultant voltage pulse exceeds a reverse latch threshold that is greater than the switching voltage threshold;

the method further comprising:

applying a first Vcom pulse as the second pulse that combines with the first pulse to form a first resultant voltage pulse, wherein a magnitude of the first resultant voltage pulse exceeds the switching threshold voltage; and applying a second Vcom pulse having a magnitude greater than the first Vcom pulse as the second pulse that combines with the first pulse to form a second resultant voltage pulse, wherein a magnitude of the second resultant voltage pulse exceeds the reverse latch threshold.

* * * * *